(12) United States Patent
Heise et al.

(10) Patent No.: US 6,501,970 B2
(45) Date of Patent: Dec. 31, 2002

(54) SUPERCONDUCTOR-BASED PROCESSING

(75) Inventors: Joerg Heise, Bissendorf (DE); Wolf-Ruediger Canders, Braunschweig (DE); Wilfried Hedderich, Westerkappeln-Velpe (DE); Franz Hehmann, Osnabrueck (DE)

(73) Assignee: Non-Equilibrium Materials and Processing (NEMP), Osnabrueck (DE)

( * ) Notice: Subject to any disclaimer, the term of this patent is extended or adjusted under 35 U.S.C. 154(b) by 0 days.

(21) Appl. No.: 09/809,431

(22) Filed: Mar. 16, 2001

(65) Prior Publication Data
US 2002/0037814 A1 Mar. 28, 2002

(30) Foreign Application Priority Data

Mar. 17, 2000 (EP) .............................. 00200992

(51) Int. Cl.$^7$ .................... H01L 39/00; H01B 12/00; H01F 6/00; F25B 15/00; F17C 7/04

(52) U.S. Cl. .................. 505/163; 505/211; 62/51.1; 62/48.1; 335/216

(58) Field of Search ................ 62/51.1, 48.1, 62/48.3; 505/211, 163; 335/216

(56) References Cited

U.S. PATENT DOCUMENTS

| | | | |
|---|---|---|---|
| 4,884,409 A | * 12/1989 | Quack et al. | 174/15.4 |
| 4,990,878 A | * 2/1991 | Takechi et al. | 324/318 |
| 5,287,026 A | 2/1994 | Ogihara et al. | 310/12 |
| 5,375,531 A | * 12/1994 | Ogihara et al. | 104/281 |
| 5,442,928 A | * 8/1995 | Laskaris et al. | 505/892 |
| 5,584,184 A | * 12/1996 | Inaguchi et al. | 62/51.1 |
| 5,625,331 A | * 4/1997 | Yamada et al. | 335/210 |
| 5,680,085 A | * 10/1997 | Aihara et al. | 335/216 |
| 6,246,308 B1 | * 6/2001 | Laskaris et al. | 324/319 |

FOREIGN PATENT DOCUMENTS

| | | |
|---|---|---|
| EP | 483 748 B1 | 6/1992 |
| JP | 62-85412 | 4/1987 |
| JP | 8-189716 | 7/1996 |
| JP | 10-132433 | 5/1998 |
| JP | 10-135029 | 5/1998 |
| WO | WO 97/09664 | 3/1997 |

* cited by examiner

Primary Examiner—William C. Doerrler
(74) Attorney, Agent, or Firm—Foley & Lardner

(57) ABSTRACT

Viable (HT) superconductor-based processing is disclosed comprising the controlled conversion of energy resulting from application of a (HT) superconductor to an electric, magnetic, electromagnetic and/or gravitational field, wherein the converted energy is released from a corresponding chill system in order to maintain a superconducting state of the (HT) superconductor under controlled extrinsic or boundary conditions. A closed vessel is instrumental to transform said energy once created into a mechanical work, a partial chill gas mass per operating time interval, i.e. $\delta dm^V/\delta t$, and a partial conduction enthalpy. A corresponding chill system comprises optionally at least one aeropneumatic accumulator designed to operate at least one (HT) superconductor-based overpressure vessel or dewar accommodating at least one superconductor element immersed into a liquid chill agent such as liquid nitrogen of defined heat capacity per volume superconductor employed. Accumulator and vessel adjacent to said accumulator form a principal unit of a universally applicable and unique differentiated composite body exploring the intrinsic properties of a (HT) superconductor under defined independent variables of the extrinsic or boundary conditions of heat transfer by heat radiation, heat conduction, heat convection as well as carefully designed insulation exploring unconventional methods of processing. This is shown for the example of levitation and conveyance of a load having a contour such as in packaging and being useful in carrying a load in a transportation process including flexible batch processing for a product, for example.

53 Claims, 12 Drawing Sheets

SUPERCONDUCTOR-BASED PROCESSING

BACKGROUND OF THE INVENTION

1. Field of the Invention

The present invention relates to a process based on application of a superconductor or high (critical) temperature superconductor ((HT) superconductor) to an external force generated by a field selected from the group consisting of an electric field, a magnetic field, an electromagnetic field and a gravitational field and to control the resulting heat balance by accommodating an energy excluding diffusion of said energy from or into an environment of said process thereby overcoming the rudimentary state-of-the-art of the first generation of (HT) superconductor-based devices by using at least one closed vessel having at least one valve, wherein the at least one closed vessel is designed to isolate a liquid chill agent of the at least one superconductor and a chill gas atmosphere coexisting with said liquid chill agent from an external atmosphere during said application. The process is optionally designed to be operated under isolation from heat conduction from environmental objects into the at least one closed vessel or dewar by levitation exploring the diamagnetism of the at least one superconductor. Energy accommodated is released stepwise by way of a partial chill gas mass per unit operating time or per operating time interval, i.e. $\delta dm^V_0/\delta t$. The invention allows to render a true service based on process-oriented technological solutions for the control of the heat balance of a true life application of a (HT) superconductor-based process.

2. Description of the Prior Art

Processing exploring the unique properties of an (high temperature) supraconductor ((HT) superconductor) has yet been limited to the triviality of a loading procedure of liquid nitrogen or derivatives (denoted as LN2 in the following) into a metal box as to the regular water intake of a steam-driven locomotive in the old days (cf. U.S. Pat. No. 5,375,531, col. 10, lines 60 to 66): "By means of cooling medium feed stations installed along a track, . . . cooling medium feed can be simple by a flow of drops . . . "). That is: processing (HT) superconductor-based application is yet as simple as "a comparatively simple structure of a combination of magnets and superconductors and complicated magnetic field control for supporting levitation is not required." (see U.S. Pat. No. 5,375,531, col. 1, lines 42–45).

Being overwhelmed by so much simplicity, no apparatus has yet earned the credentials of allowing, providing or even facilitating a real life process based on the properties of a (HT) superconductor. A single apparatus has yet not advanced to a process (cf. independent claims 1, 2, 4, 6 and 8 of U.S. Pat. No. 5,287,026) as much as a combination of three or even more devices can not stand a chance for a process based on application of a superconductor just by having certain features (independent claims 1, 18, 19, 20 and 22 of U.S. Pat. No. 5,375,531). Features are yet limited to having a "cooling device" (cf. claim 1 in U.S. Pat. No. 5,287,026) or "means of cooling" (dependent claim 7 in U.S. Pat. No. 5,375,531) to eventually assure that more than one superconductor (element) becomes coolable independently (independent claim 22 of U.S. Pat. No. 5,375,531).

Prior art does not consider to subject a (HT) superconductor to sustainable real life applications. As shall be analyzed below toward a first (HT) superconductor-based processing on record, the maintenance of the unique state of superconductivity (which represents the number one condition for any (HT) superconductor-based processing) versus any incoming heat energy, $dQ_i$, has yet been compensated for by exploring the enthalpy of evaporation of LN2, $\Delta H_V$. This follows the relationship $\Sigma dQ_i = \Delta H_V$ and it is hence only consequent that not a single origin of $dQ_i$ in running a (HT) superconductor-based apparatus has yet been disclosed with or without teaching ambiguities about processing conditions involved. The discussion of prior art in U.S. Pat. Nos. 5,287,026 and 5,375,531 themselves reveals the limited depth of corresponding inventions.

Hitachi disclose five embodiments (U.S. Pat. No. 5,287,026) of a superconducting magnetic levitation apparatus comprising evaporation into an undefined environment X of a liquid cooling agent to chill a high temperature superconductor ((HT) superconductor) below critical temperature $T_c$, wherein said environment comprises a track having one or more permanent magnets for the movement of said apparatus. One embodiment discloses a vacuum chamber which is kept by a refrigerating machine at a temperature below the critical temperature $T_c$ of said (HT) superconductor so that the operating conditions of said chamber are directly coupled to the operating conditions of said chill agent for maintenance of an illdefined superconducting state of said apparatus accommodated by said chamber and vice versa. For example, one can not exclude the environment of the (HT) superconductor chill system to contain a partial over- or underpressure due to excessive escape of corresponding chill agent or oxygen from said apparatus, wherein said partial over- or underpressure can exceed a critical thresholds for controlling a process based on said apparatus. This holds particular true because there was no disclosure of a pressure or temperature of a non-condensed material which both form important variables for processing under any conditions, whether non-adiabatic or adiabatic and being subjected to real requirements or wishful thinking.

For example, an open box containing LN2 or a chilled system exposed to an undefined environment X does not provide an adiabatic apparatus, whether this apparatus comprises insulating shielding or not (see U.S. Pat. No. 5,375,531, col. 14, line 47). Also in U.S. Pat. No. 5,375,531, the embodiments require LN2 to be dropped naturally into an open box accommodating (HT) superconductor in order to assure that a levitation body can run for many hours. The embodiments by Hitachi represent very impractical solutions for a process in real life in which usually an operation was required to be performed under a controlled atmosphere or at an ambient temperature or employing both options independent on the boundary conditions required to accommodate said apparatus by an atmosphere, whether said atmosphere is accommodated itself by an additional chamber or not. The bottom line of (HT) superconductor-processing to date is that an apparatus exploring supraconductivity has yet to accomplish a service despite its apparent simplicity which rather misleads interpretations associated with the apparatus. One has to ask, for example, how such a service can be rendered in view of an open box declared as being adiabatic but effectively representing everything else but adiabatic conditions (see col. 14, line 47 of U.S. Pat. No. 5,375,531).

Accordingly, U.S. Pat. Nos. 5,287,026 and 5,375,531 are limited to either (i) short effective operating times or (ii) extended operating times in both of which the operating costs increase excessively with operating time and operating capacity because they are directly coupled with the excessive loss of the chill agent or removal thereof or with an excessively limited performance such as in a conventional vacuum chamber or with an increase in investment for (eg. vacuum) pump station equipment required to provide an excess in pumping speed with regard to a conventional counterpart or with a combination thereof, all representing extremely unrelated methods to compensate for an introduction of an energy into the superconductor or its chill system. Also, the operating heat flow remained obscured or undefined in prior art.

An alternative embodiment in U.S. Pat. No. 5,287,026 incorporates an (HT) superconductor to form a track surrounded by flow channels for a cooling liquid or gaseous chill agent in order to use a magnet as a floating body, for example. However, the apparatus was not disclosed to comprise a protection against loss of chill agent during transport and resulting increase of operating costs. Such a protection would have been essential to define boundary conditions for a viable exploration of (HT) superconductor by processing such as via levitation and carrying a load to circumvent current standstill in the development of (HT) superconductor-based processing.

The embodiments provided by U.S. Pat. No. 5,287,026 are subjected to unrealistic boundary conditions in a more demanding process because the chill system is an open system resulting in (i) high operating costs for a chill agent of the (HT) superconductor employed, (ii) high investment costs for (HT) superconductor-tracks since (HT) superconductor are rate-controlling in the amortization of any (HT) superconductor-based process or apparatus, (iii) high cost to maintain lateral stability $\delta(dz)/\delta t \rightarrow O$ via permanent magnets conducting environmental heat (eg. afforded by convection) into the chill system (n.b. any magnetic field gradient dB/dz toward infinite is as good as the superconducting magnetic levitation apparatus assigned to accommodate said gradient and resulting heat introduced into a superconductor moving magnetic inhomogeneities) and (iv) limited performance including limited operating times resulting from the lack of insulation or environmental control or controllable boundary conditions and which dictate magnetic field gradients dB/dz as the ultimate solution to minimize and limit external heat input into the (HT) superconductor carrier system as a result of in-homogeneities of the magnetic field being traversed by said carrier system.

The following documents disclose closed cooling systems including those of a superconductor, but without comprising a levitation or employing a thermal control of said cooling system beyond an unrelated cooling gas:

JP 62085412 (1987) by J. Yoshihiro of Mitsubishi Electric Corp. discloses a cooling device allowing for independent thermal loading and heat absorption per superconductive coil by decoupling two different coils in an individual tank for each coil and using a common liquid source in one tank coupled to both coils. Evaporated cooling agent is released to the internal atmosphere above common liquid by an internal gate to compensate for pressure loss there. The evaporated cooling agent could then also be released to an environment through a gravity check valve and an emergy discharge pipe from said cooling device, but no information was disclosed how to run the discharging operation. No information is available on the thermal behaviour of the device with time, either, such as upon release of energy to the environment via a form of a cooling agent.

JP 10135029 (1998) by S. Eiji of Railway Technical Research Institute discloses two release valves for alternating inner pressure control above a cooling liquid in two storage tanks coupled by a passage in order to move by pressure-induced pushing a cooling liquid through said passage, since an object to be cooled is located externally on a surface of said passage. The operation to discharge the gaseous chill agent from a chamber comprising a liquid chill agent is run in such a way that one of the two release valves is triggered to allow corresponding level of liquid cooling agent in one of the storage tanks to increase and become higher than that in a second storage tank before this operation is repeated by the other of the two release valves connected to the second storage tank and comprising the relatively low pressure or higher level of liquid cooling agent. No teaching is provided, however, how to quantify mass or energy stored in the storage tanks between alternating openings or when being released or when stored elsewhere while being released from one or more of said storage tanks. Accordingly, no information is available on the thermal behaviour of the device with time, either, such as upon release of energy to the environment via a form of a cooling agent.

In addition to JP 10135029, JP 10132433 (1998) by S. Eiji of Railway Technical Research Institute discloses an additional cooling chamber to recuperate and eventually reliquefy the evaporated gas over a third liquid which is then being forced by gravity back into a tank comprising the lower of the two inner pressures of the two storage tanks (cf. discussion of JP 10135029 above). The refrigerant passage for the object to be cooled is thus continuously fed in conjunction with a reciprocating up and down in height of liquid and underpressure, respectively, in said two storage tanks. However, there is no information on the thermal behaviour of the storage tanks with time such as upon release of cooling agent to the additional cooling chamber and elsewhere or how to control this thermal behaviour inside the pressurized and depressurized storage tanks with time.

It was interesting to note that JP 08189716 (1996) by M. Shinobu of Mitsubishi Heavy Industries Ltd. discloses adiabatic expansion of helium gas used to cool a magnetic body via cooling the temperature of said helium gas while being separated from a superconductor immersed in a liquid chill agent, but no gas release operation was disclosed for a thermal control of said superconductor and its liquid cooling system with time. In such a system, a superconductor can only be chilled by employing a gas release should an artificial cooling via external heat extraction thus inverted heat conduction be avoided.

Accordingly, the state-of-the-art on record does not disclose a thermal control of a superconductor with time by a release of a chill agent from a closed system accommodating said superconductor in a superconductive state in a liquid chill agent and which would require a mass balance of the constituents of said cooling system. Also the more recent developments for superconductor based bearings in fly wheel (spinning) energy storage systems do not disclose a teaching how to operate the energy exchange of a cooling system comprising a superconductor toward long term thermally controlled application of a superconductive state (see WO97 09664). This applies in particular to a levitating apparatus exploring the diamagnetic behaviour of a superconductor and resulting insulation from heat conduction into corresponding chill system from an environment of said chill system.

DISCLOSURE OF THE INVENTION

Figure 1A:
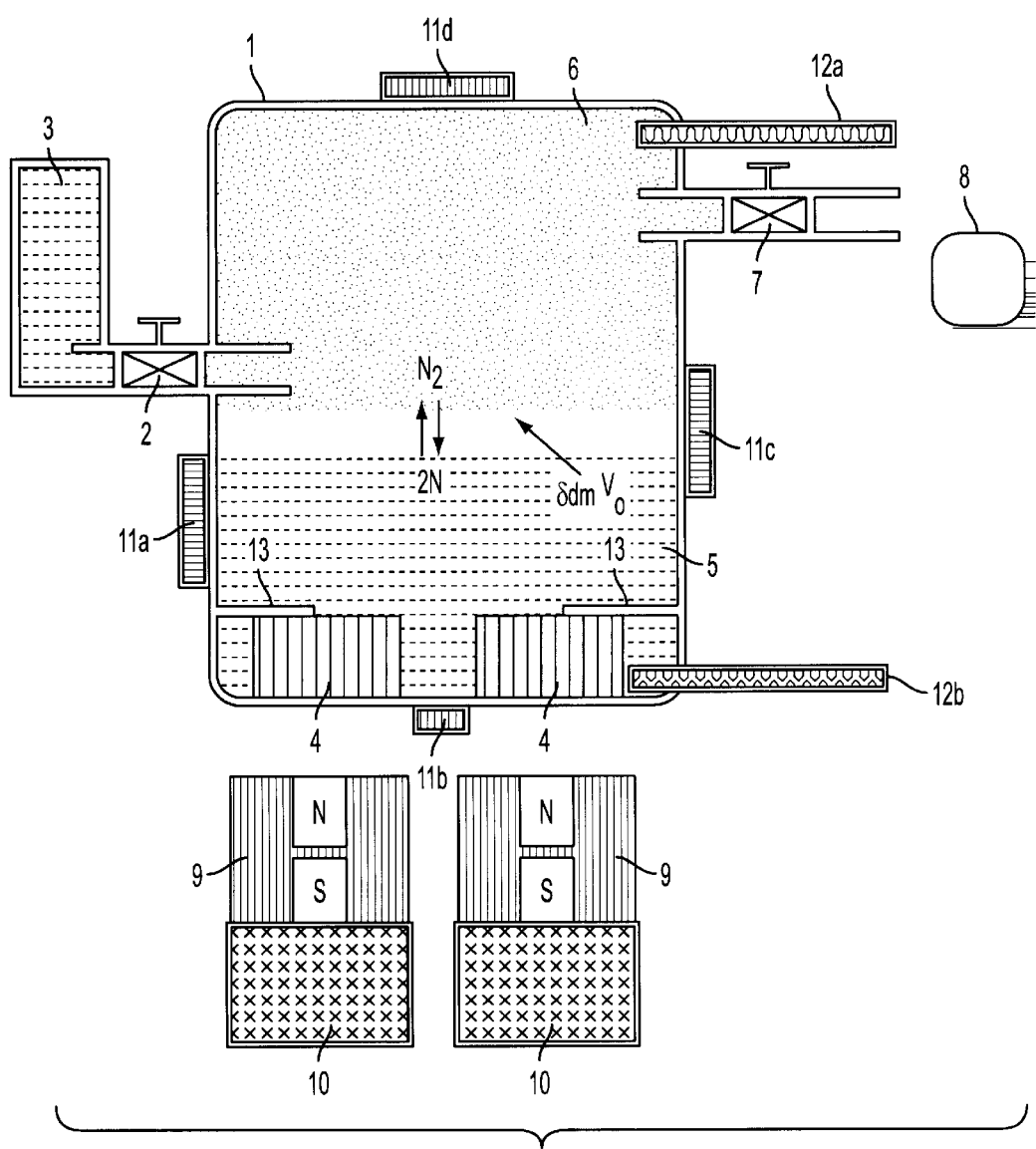
FIG. 1 (a) Accommodation of external energy in a closed vessel comprising a liquid chill agent to chill at least one superconductor and a chill gas in a closed vessel, said chill gas being in a dynamic equilibrium with said liquid chill agent and developing overpressure relative to an external atmosphere 8, (b) with load support 14 and insulation 15.

It is the objective of the invention to provide a (H) superconductor-based process having a high capacity to accomodate energy from interaction of the (HT) superconductor with external conditions including an external magnetic field, magnetic field inhomogeneities and resulting hysteresis effects, heat generated by driving forces including loading, deloading, linear propulsion coils and eddy currents resulting from corresponding interaction including a reduced heat flow from a given environmental atmosphere or environmental contact excluding diffusion, optionally also conduction, but including heat convection and heat radiation between a load and/or a permanent magnet on the one hand and superconductor chill system on the other to provide viable, stationary as well as defined conditions for (HT supraconductor based processing including processing in remote applications, in particular for transport in clean as well as in dirty rooms or volumes (note: in clean rooms, wear by transport is to be suppressed in order to keep the room clean, while in dirty rooms any wear would risk to result in an imminent disaster because of the effect of abrasion inherently involved otherwise) and which are eventually being closed off by a chamber, in particular by a vacuum chamber to create adiabatic or near adiabatic process conditions. Said process copes with true temperatures of critical design and transport parameters including the temperature of the (HT) superconductor-chill system vs. the temperature of the load and the chamber accomodating the remote system as well as the control of important interactions of the (HT) superconductor-based system via heat flow produced by typical transport phenomena related to this realistic (HT) superconductor-based levitation transport apparatus, both of relevant size useful in given and new transport systems comprising real boundary conditions. The invention includes a closed cooling system for a principle differential arrangement designed to separate (HT) superconductor and corresponding chill agent from a permanent magnet by said system and thus the opposite solution compared to that disclosed by prior art: a recycable chill agent by assigning the chill function solely to the differentiated transport body or carrier by limiting at the same time application of the (HT) superconductor to said transport body or carrier. The symbol LN2 is used in the following to represent a liquid chill agent of the group consisting of liquid nitrogen, liquid helium, liquid argon, liquid hydrogen, liquid oxygen and an inert liquid of the group of Ne and Xe for maintenance of a superconductor.

DETAILED DESCRIPTION OF THE INVENTION

A solution to overcome the limitations of the above apparatus by Hitachi and hence opening the avenue for a first viable HTSL-based processing route requires a careful analysis of the critical step involved in the cooling operation of said apparatus by Hitachi. The reason for the limitation of the application of the apparatus by Hitachi originates in the cooling principle applied:

The coolant absorber action is effectively limited by a plate forming an interface between (HT) superconductor and liquid nitrogen in which the temperature of the interfacial plate is at the same time a function of the temperature of the environment to which this plate is largely exposed without an insulation, whatsoever. The effective temperature of the interfacial plate is thus a result of a dynamic equilibrium between flow of heat from the plate into the environment including chill agent on the one hand and flow of heat from the environment including the (HT) superconductor into this plate. Temperature fluctuations of the chill agent on the interfacial plate are considered to be neglible in a first approach. Accordingly, the heat of evaporation of liquid nitrogen is the rate-controlling factor for the heat exchange between (HT) superconductor via the plate with the environment. As a first result of this analysis, one must conclude that the plate between (HT) superconductor and liquid chill agent in U.S. Pat. No. 5,287,026 was erroneously and hence very misleadingly denoted as a "heat sink" because it has effectively the function of a "heat provider" in corresponding superconducting magnetic levitation apparatus by Hitachi providing heat from the (HT) superconductor to the liquid chill agent.

The capacity of the interfacial plate to cool the (HT) superconductor thus depends on the capacity of this plate to release heat absorbed from the (HT) superconductor via the heat of evaporation of the chill agent to the environment. That is, though being denoted as a "coolant" absorber, trivial per se, the interface between (HT) superconductor and liquid nitrogen in the apparatus by Hitachi is an effective "heat" absorber the capacity of which depends entirely on the amount of chill agent being evaporated. Such a principle is not capable to run a superconducting magnetic levitation apparatus in a process despite the fact that the heat capacity of the environment may be considered as being infinite in relation to a given process.

The reason is that cooling and maintenance of the (HT) superconductor requires to lose a chill agent such as liquid nitrogen rather than to recuperate and maintain a reservoir of a chill agent including liquid nitrogen. A process using a superconductor would accordingly be rate-controlled by the loss of chill agent and corresponding environment accomodating the loss rather than by a control through the operator. Also, the capacity to keep corresponding (HT) superconductor in the superconducting state is thus directly coupled to the capacity of the interface to release heat required to facilitate the endothermal evaporation of the chill agent. Such a capacity is not only extremely limited and thus to absorb major evolutions of heat in a (HT) superconductor subjected to processing conditions (nb. any impact of process irregularities would limit corresponding (HT) superconductor-applications to a scale which is irrelevant in an industrial operation). Moreover, the dependence on the heat capacity of an interfacial plate between (HT) superconductor on the one hand and liquid nitrogen on the other undermines any process control because corresponding heat flow is interface controlled by at least two interfaces. The derivatives of cooling disclosed in prior art follow the above principle, since LN2 is stored in open systems of the group consisting of open boxes, open tubes and devices the volume of which accommodating LN2 and being exposed to an undefined environmental atmosphere including normal or cryogenic temperatures.

In conclusion, loss of nitrogen through evaporation and resulting excessive increment in operation costs is not only instrumental to furnish the working principle to the superconducting magnetic levitation apparatus by Hitachi, it also limits its operation to short operating times under given conditions including a unit mass of operative liquid chill agent which is subjective to explosion under conditions of a vacuum, for example. These conditions are also subjected to a continuous change resulting from the working principle applied and which requires to accomodate gazeous nitrogen by the environment of the HTSL. Accordingly, the superconducting magnetic levitation apparatus by Hitachi is not a practical solution for application in a (HT) superconductor-based processing for purposes which are different from a short and limited demonstration of superconductor's diamagnetism.

Embodiment 1

As a result, one wants to invert the principle to cool the (HT) superconductor of the superconducting magnetic levitation apparatus by Hitachi and retain liquid nitrogen (or any other chill agent such as liquid helium, liquid oxygen, liquid argon etc.) as long as possible while absorbing heat introduced externally from processing into corresponding (HT) superconductor or from environmental contact of corresponding chill system by conduction, convection and radiation at the same time by (complete or at least partial) immersion said (HT) superconductor in said LN2 and eventually using an excess (XS) quantity (mass) of LN2 to enhance corresponding running hence loading capacity for a given (maximum) levitation force employed. Instead of transforming externally introduced heat into a heat of evaporation (which is always since naturally accompanied with the loss of corresponding agent evaporated), an industrially useful principal is to convert such energy into mechanical work carried out by a cooling system for a diamagnetic (HT) superconductor closed off against diffusional interaction with a given environment and levitating against heat conduction from said environment following the principle:

$$\Sigma dQ_i = dE = dU_0 + dW = dU_0 + P_0 dV^V{}_0 \quad \text{eq. (1)}$$

with $dU_0 = V^V{}_0 dP_0 + \Delta H_V = c_V m_0 \int dT^V{}_0 + \Delta H_V$ and $P_0 dV^V{}_0 = m^V{}_0 R_s T^V{}_0 \int dV^V{}_0 / V^V{}_0$ so that by including the heat stored by the liquid chill agent one obtains $$\Sigma dQ_i = c_p \int \int dm^L{}_0 dT^L{}_0 + \Delta H_V + c_V \int \int dm^V{}_0 dtm^V{}_0 + Rs \int \int \int dm^V{}_0 dt^V{}_0 dv^V{}_0 v^V{}_0 \quad \text{eq. (2)}$$

where $Q_1$ is a heat quantity introduced externally via interaction i such as by convection, radiation or Eddy currents into the (HT) superconductor chill system with an environment or via creep flux when a superconductor is sustaining an inhomogeneity of a magnetic field and corresponding hysteris effect and dW being mechanical work carried out by a (HT) superconductor chill system transforming said heat via an increase of internal energy dU of chill gas atmosphere into said mechanical work so, wherein a partial quantity is added to the gas phase without escaping from the closed vessel (i.e. no diffusion into environment), to providing a superior capacity to accomodate $\Sigma dQ_i$ toward a long running (HT) superconductor process as a function of mass and heat capacity of said mass within an allowable range or temperature and pressure of said chill agent within said apparatus, and to systematically explore the potential to minimize $\delta dQ_i$ under such conditions.

Figure 1B:
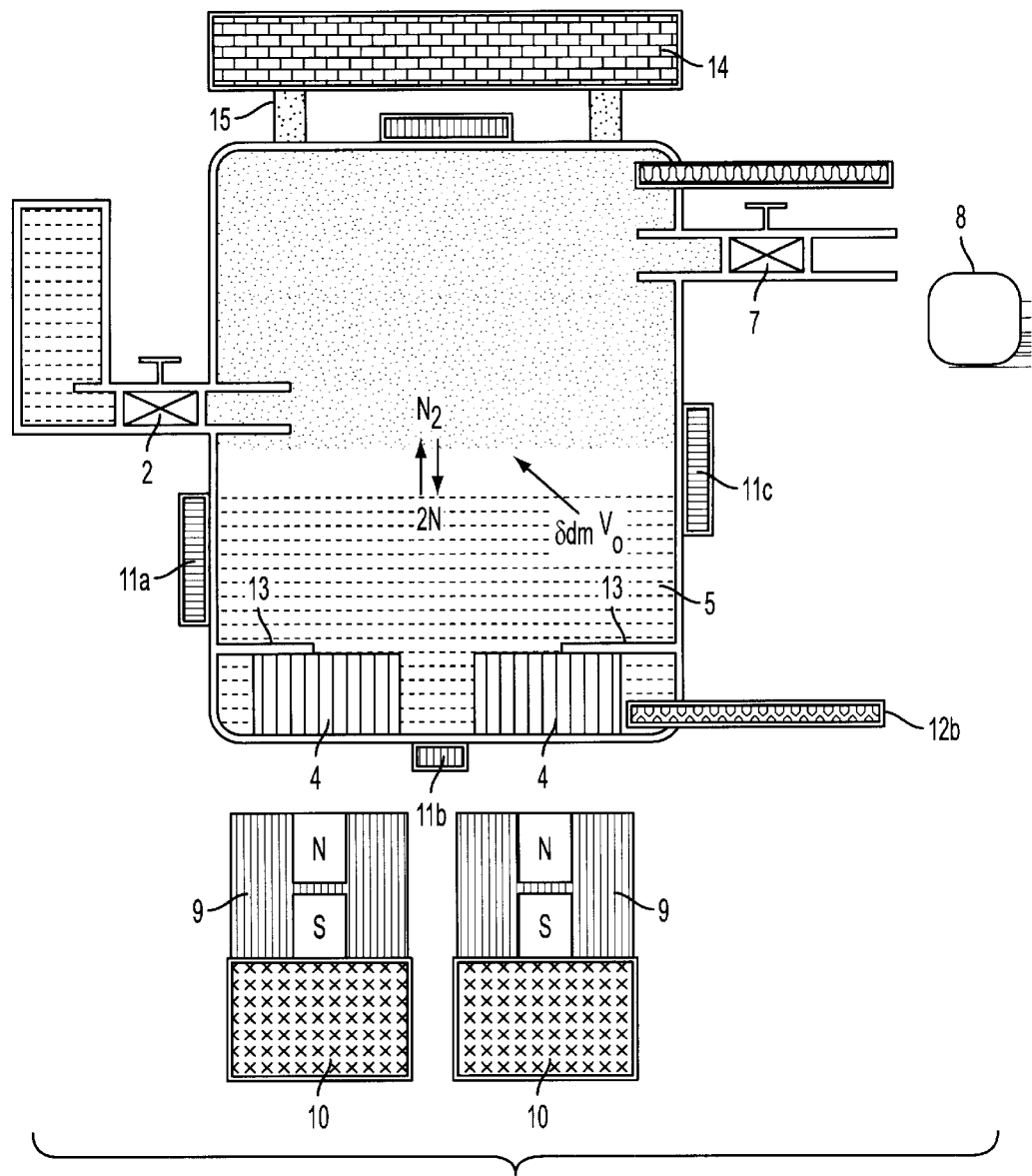

FIG. 1a shows a levitating 1 closed (chill and overpressure) vessel with an 2 inlet valve for supply with 5 liquid chill agent (optionally) from an external LN2 reservoir 3 accomodating a 4 (eg. HT) superconductor, showing dynamic equilibrium of 5 $2N<==>N_2$ with 13 fixing or clamping lever and 6 chill gas atmosphere and partial chill gas mass $\delta dm^V_0$ $V_0$ released per cycle of pressurizing the closed vessel by $dP_0 = -(P_{0(1)} - P_{0(2)})$ via evaporation of said liquid chill agent during levitation on 9 permanent magnet optionally chilled by 10 external cooling system eg. by using external water circuit prior to release said partial chill gas mass via 7 gas outlet valve into 8 external atmosphere. 11 Dilatation recording strips monitor deformation in 11a liquid chill region, 11b between superconductors, at 11c transition liquid chill agent/chill gas atmosphere and 11d chill gas atmosphere. Thermocouples record temperature in 12a chill gas atmosphere and 12b liquid chill agent. FIG. 1b: One can add a support 14 having insulations 15 to keep apart a load having temperature $T6>>T^L_0$ of the liquid chill agent, for example. Devices 2, 7 11a–d and 12a and 12b are operated by telecommunication to circumvent any heat conduction from outside this closed vessel into the closed vessel during levitation.

Figure 2A:
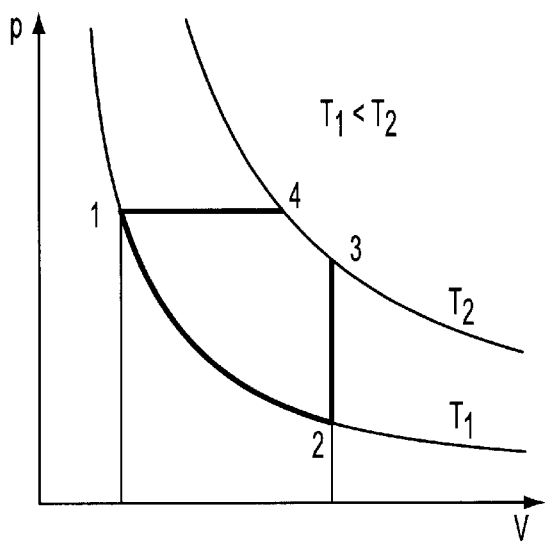
FIG. 2 shows pressurizing and depressurizing a gas as a function of gas volume using the universal PV-diagram with $PV^n$=const; 2(a) shows principle limiting transformations of state of the chill gas in the closed vessel including two isothermal reactions along the curves $T_1$ and $T_2$, 2(b) shows an underisothermal release of partial chill gas mass into an external atmosphere, $\delta dm^V O$, and 2(c) shows the work $d^3W$ carried out by the chill system under consideration during a time interval of a process cycle, dt (hatched area).

FIG. 2a shows principle limiting transformations of state of the chill gas in the closed vessel including two isothermal reactions along the curves $T_1$ and $T_2$. An increasing overpressure is in a (pneumatic) equilibrium with said liquid agent by accommodating an increasing quantity of said gas evaporated, thereby accommodating said thermal energy by increasing a chill gas pressure of said chill gas atmosphere, $P_0$ optionally without increasing a chill gas volume of said chill gas atmosphere, $V^V_0$, wherein said closed vessel is fabricated from a fully rigid metal or alloy. If pressure increase $V^V_0 dP_0$ occurs without dilatation (such as in a fully rigid vessel), the reaction is isochorous (see upper representation from 2 to 3). An isobare reaction from 1 to 4 requires a vessel material that dilates without the need to bring about a pressure increase, i.e. this is not possible under current conditions as the opposite relative to prior art shall be carried out. Also the pressure increase can not be isothermal such as from 1 to 2 or from 4 to 3, because the chill system is the coldest part relative to the environment so that there is no heat flow through convection or radiation away from the closed vessel toward the external atmosphere (heat conduction to an adjacent closed vessel is not discussed here, see claim 18). Accordingly, mechanical work $P_0{}^d V^V_0$ and $V^V_0 dP_0$ under above boundary conditions occurs during which the internal energy of the chill gas atmosphere increases via a temperature increase by an amount $dT^V = T^V_{0(2)} - T^V_{0(1)}$ wherein $T^V_{0(2)}$ is below a critical temperature $T_c$ despite an endothermal evaporation of said liquid chill agent into said chill gas atmosphere in the at least one closed vessel by a defined mass $dm^V_0 = -(m^V_{0(1)} - m^V_{0(2)})$ hence a defined enthalpy of evaporation, $\Delta H_V$.

Increasing a chill gas volume of said chill gas atmosphere by an amount $dV^V_0 = -(V^V_{0(1)} - V^V_{0(2)})$, occurs in conjunction with elastic and plastic deformation of said closed vessel. The amount $dV^V_0$ is at least partially, i.e. $\delta dV^V_0$ released into an external atmosphere including optionally a storage atmosphere of an aeropneumatic accumulator designed to be operated at a pressure differential $dP/dx$ relative to the storage atmosphere of the vessel accomodating at least one superconductor. In reality, however, deliberate dilatation such as by employing a highly inflatabale material always occurs along with a simultaneous increase of pressure, i.e. $(V^V_0 dP_0 - P_0 dV^V_0)$ i.e. increasing a chill gas volume of said chill gas atmosphere, $V^V_0$, and increasing a chill gas pressure of said chill gas atmosphere, $P_0$.

Figure 12:
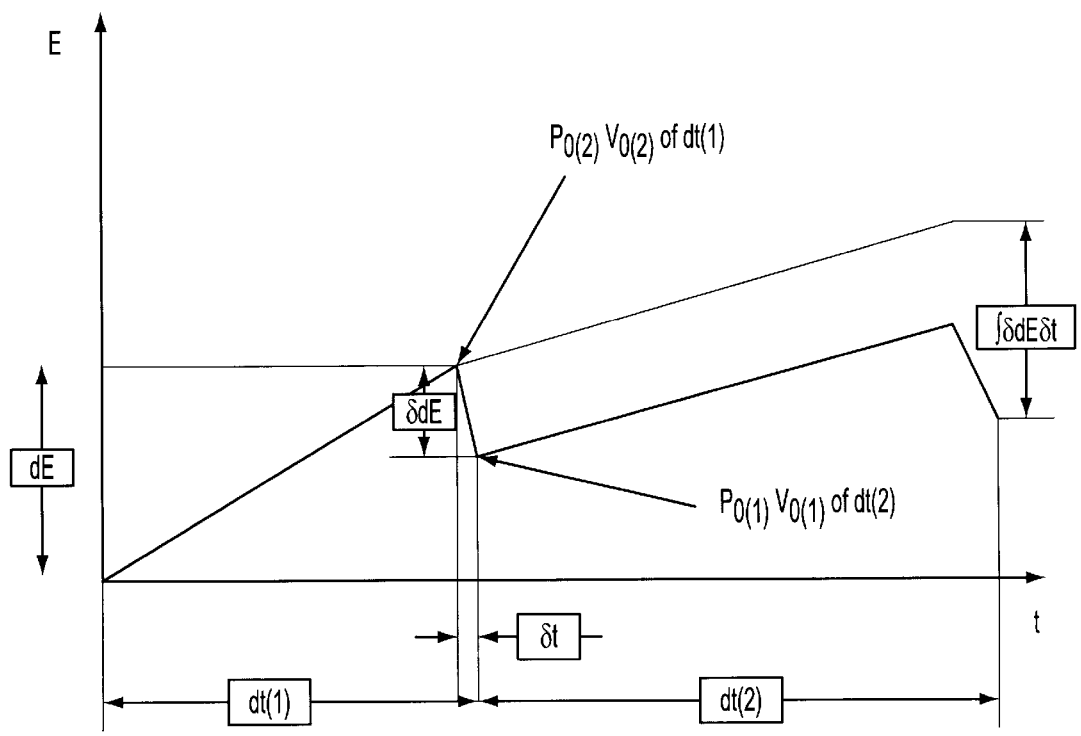
FIG. 12 Showing increment of energy, dE, during a first process cycle dt(1) of a closed vessel comprising chill gas atmosphere, liquid chill agent and a superconductor and operating unit time, $\delta t$, during which a partial quantity of said increment, $\delta dE$, is released by way of opening a valve of said closed vessel followed by a second process cycle during time interval dt(2) of said closed vessel as well as integral energy released from said closed vessel during both process cycles, $\int \delta dE \delta t$.

The process according to claim 1 comprises at least $n_c = 1$ (one) Unit operating time, $\delta t$, for release of a partial chill gas mass into an external atmosphere, $\delta dm^V_0$, wherein said process further comprises accomodating an energy before and during said release is performed, wherein said energy results from application of a superconductor, wherein said application comprises increasing a chill gas volume of said chill gas atmosphere, $V^V_0$, or increasing a chill gas pressure of said chill gas atmosphere, $P_0$, during a time intervall of a process cycle, dt, which incorporates the unit operating time, $\delta t$ (cf. FIG. 12). The external atmosphere can be a natural environment or a storage gas atmosphere of an aeropneumatic accumulator designed to be operated by a pressure differential $dP/dx$ between the chill gas atmosphere and said storage atmosphere via a gas inlet or poppet valve (see embodiment 2 below) or between said storage atmosphere and the external atmosphere via a gas outlet of said aeropneumatic accumulator.

FIG. 2a shows limiting cases of the $pV_n$=const.-relationship with n=infinite for isochorus reaction along distance 2-3 or 3-2, n=1 for isotherm reaction along distance 1-2 or 2-1 and 3-4 or 4-3, n =0 for isobar reaction along distance 1-4 or 4-1 and (middle section) comparison of isothermal reaction (curve 2 with n =1) and underisothermal reaction (curve 2 with n>1; nb. for an ovenisothermal reaction 1>n>0) and (bottom) principle reactions according of chill gas during pressurizing closed vessel from 1 to 2 according to FIG. 1 and claim 1 and underisothermal release of partial chill gas mass $\delta dm^V_0$ from 2 to 3 as well as resulting work $d^3W$ carried out. nb. in. the literature, underisothermal reactions in the range of an overadiabatic reaction, i.e. for k>n>1 are often referred to as polytrope functions. However, polytrope reactions should include here all reactions being different from a limiting case such as an increase in pressure while volume may increase at the same time following the reaction 1-2 in the lower section, i.e. even when n is negative though in the invention this is associated with an increase of the unit gas mass concerned.

Figure 2B:
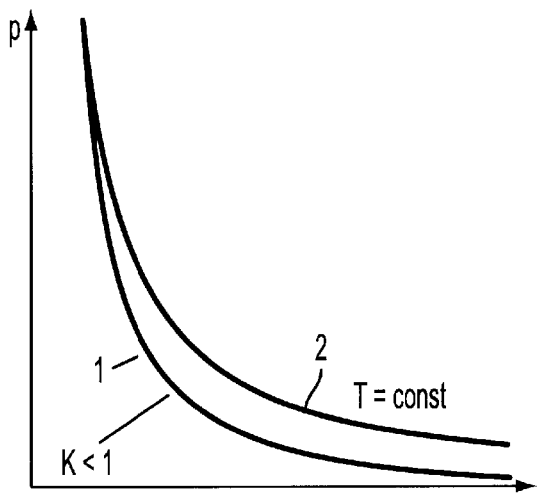
Figure 2C:
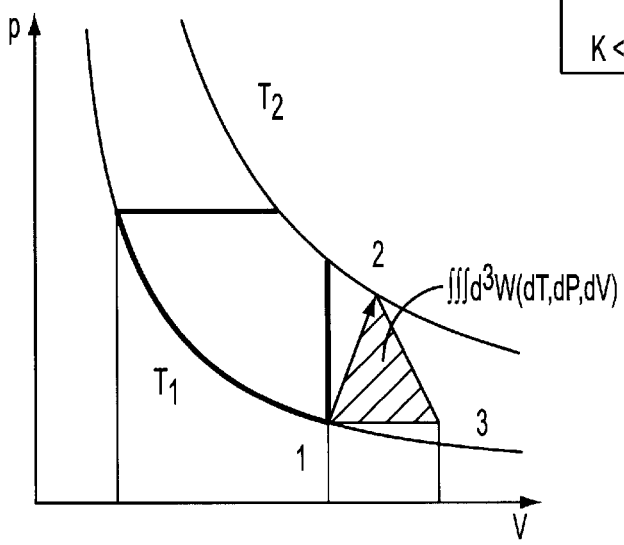

The change of chill gas state during a time intervall of a process cycle, dt, comprise an underisothermal release of $\delta dm^V_0$ upon opening of the at least one valve of the at least one vessel or dewar, wherein said underisothermal release includes an overadiabatic reaction (i.e. K>ii>1 wherein $K = c_p/c_V$, where $c_V$=specific heat capacity of gas at constant volume and $c_p$=specific heat capacity of gas at constant pressure), an adiabatic reaction (n=K) and an underadiabatic reaction (n>K) release of $\delta dm^V O$. An underisothermal release of said partial chill gas mass into an external atmosphere, $\delta dm^V O$, is shown in FIG. 2b where the effect of an derisothermal coefficient on the pV-relationship by Boyle-Mariotte is shown relative to an hypothetical isothermal gas expansion. It shall be noted that an undenisothermal release of a chill gas mass into said accumulator (see also claims 5, 7 and 8) is possible without (eg. plastic) deformation of the closed vessel. FIG. 2c illustrates the work $d^3W$ carried out by the chill system under consideration during a time intervall of a process cycle, dt (hatched area), including the path from 2 to 3 representing underisothermal expansion during said unit operating time, δt, for said underisothermal release of $\delta dm^V O$.

FIG. 12 shows the effect of this operation on the energy balance of the chill system of FIG. 1. In order to maximize the overall operating time of the chill system $n \int dt$ (cf. FIG. 13), it follows that technical solutions are designed to minimize $\Sigma dQ_i$ on the one hand and maximize the RHS of eq. (1) on the other (compare claims 6 through 8). The most appropriate solution is a process running a vessel in an environment having temperatures higher than the critical temperature $T_2$ of the (HT) superconductor and the temperature $T_2$ of a chill agent for a (HT) superconductor such as liquid nitrogen, wherein the vessel is the continuously superconducting magnetic levitation apparatus depicted in FIG. 1 and comprising at least one dewar filled with liquid nitrogen (or liquid argon or any other liquid chill agent) into which the at least one (HT) superconductor block (preferably a single crystal quader made by a casting route) is immersed as well as at least one aeropneumatic accumulator designed to accomodate an overpressure of a given non-condensed material (often referred to as a gazeous substance) by an underpressure, wherein said non-condensed material stems from evaporation of said chill agent in said dewar.

It shall be noted here that embodiment 1 employs direct cooling of (HT) superconductor by liquid nitrogen in a closed system without having an interface between (HT) superconductor and liquid nitrogen other than the interface between the (HT) superconductor and the chill agent itself, but introducing at the same time at least one interface to a volume accomodating excess chill agent resulting from externally introduced heat, that is that the liquid nitrogen or an equivalent chill agent is the "sink" of an externally introduced heat and not a separating plate between (HT) superconductor and said chill agent, corresponding principal heat flow direction being, without ambiguity, accordingly from the (HT) superconductor to the chill agent and not vice versa.

Embodiment 2

Figure 3:
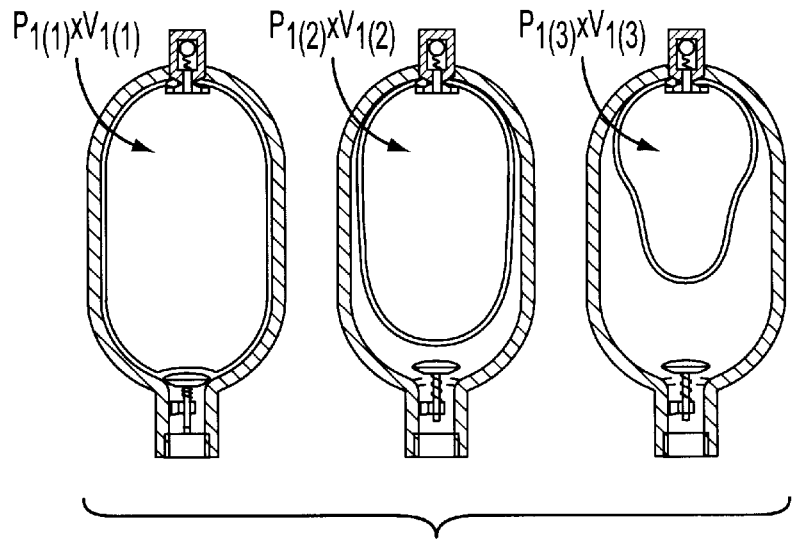
FIG. 3 Working principle of aeropneumatic accumulator.

One way of maximization of the overall operating time of the chill system $n \int dt$ under given boundary conditions of processing is accomplished by employing an aeropneumatic accumulator into which gazeous chill agent is released after a time intervall of a process cycle, dt, which incorporates δt hence covering the time for accomodation and processing $\Sigma dQ_i$ by partial release via $\delta dm^V_0$ from said chill apparatus comprising an overpressure vessel or dewar designed to store the (HT) superconductor and liquid chill agent and chill gas atmosphere. Release of gazeous chill agent (such as gazeous nitrogen over a bath of liquid chill agent such as liquid nitrogen) is triggered eg. when an overpressure $P_0$ in said vessel or dewar exceeds a critical value $P_{O(2)crit}$) relative to a value of an underpressure $P_1$ in said accumulator (cf. also claims 1 and 9 through 13) following the law by Boyle-Mariotte. Once a critical value of $P_{O(2)crit}$) was achieved, one can progressively accomodate $\delta dm^V_0$ by using the aeropneumatic accumulator with the effect that each time the storage gas mass shrinks its volume as shown in FIG. 3 and likewise increasing the pressure of this residual volume while the overall volume is then filled with a (coexisting, FIG. 3 representing the case without said mixture to illustrate very schematically the relationship of this example with regard to said law by Boyle-Mariotte) mixture consisting of the former storage gas mass plus the released mass $\delta dm^V_0$ at that new and increased pressure, i.e.:

$$(P_{1(1)}*V_{1(1)})^n = (P_{1(2)}*V_{(2)})=(_{P1(3)}*V_{1(13)})^n \qquad \text{eq. (3)}$$

where n=polytropic coefficient (such as K for adiabatic release of $\delta dm^V_0$, see embodiment 1 and FIG. 2), $P_{1(1)}$ is the pressure before and $P_{1(2)}$ the pressure in said accumulator after said release of said mass $\delta dm^V_0$, as well as $P_{1(3)}$ being the storage gas pressure after the next following cycle, volumes being designated here accordingly. There are various ways in which $\delta dm^V_0$ can develop with number of process cycles hence overall operating time and this depends on the automisation programme under which corresponding variables are recorded and fixed (see claims 9 through 13 and FIG. 13). For example, the volume of chill agent stored at a release into the aeropneumatic accumulator in the gazeous state is given by $$\delta dV^V_0 - (V_{1(3)} - V_{1(2)} = V_{1(1)}* - P_{1(1)}/P_{1(3)})^{1/n} - P1(1)/P_{1(2)}^{1/n} \qquad \text{eq. (4)}$$

The critical pressure in this scenario represents at the same time a pressure differential. Since increases over $P_{(1)1}$, $P_{O(2)crit}$ increases accordingly each cycle should the pressure differential be kept constant during operation. Should $P_{O(2)crit}$ be kept constant, corresponding pressure differential decreases with number of cycles and overall operating time. One can also search for intermediate solutions so that the mechanical work carried out by the system is kept constant and/or maximized depending on the characteristics of the apparatus. A solution is conveniently being resolved numerically by the appropriate Taylor series so that one can also write for maximum storage capacity $P_{tmax}$ of thermal energy per process cycle of the chill system of the at least one superconductor, i.e. $P_{tmax} = \int \int d(dH_{max})/dt$ (eq. (5). $P_{max}$ takes into account the time-dependent distribution of thermal energy within a chill system of interest and which includes the effect of $\delta dm^V_0$ on at least one of at least the constituents 1, 2, 4, 5, 6 and 7 of FIG. 1a.

FIG. 3 shows a typical aeropneumatic accumulator employed in this scenario and comprising bleed 22, port for chill gas inlet 16, poppet valve 17 used as the gas inlet valve, a representative quantity $\delta dm^V_0$ accomodated and represented here by a simple hatched area 18, 19 being the storage gas volume after inlet of 18, 20 the shell of the aeropneumatic accumulator and 21 the gas outlet valve to release storage atmosphere into an external atmosphere. The poppet valve 17 is designed to open at critical variables following claims 9 through 13 such as a pressure differential until pressure in both the dewar and the accumulator are in equilibrium. Then the poppet valve is closed again until a subsequent pressure differential is reached by the system, corresponding sensors operating on either side to monitor the pressure differential, for example, before opening the dewar such as via a poppet valve of the accumulator. When the closed vessel or dewar is opened and gazeous chill agents flows into the accumulator, an polytrop pressure decrease occurs as is shown in FIG. 2c, path 2 to 3.

Corresponding energy balance per thermally charging the chill apparatus followed by (partially) discharging the increase in internal energy of the closed vessel or dewar via a release of mechanical work into the accumulator is provided by eq. (8) below.

The process utilizes a liquid chill agent comprising a heat capacity per volume superconductor employed, i.e. $\Delta H = cm^L dT^L/V_s$ in $[Jm^{-3}]$, wherein c is a specific heat capacity of said liquid chill agent, m is an employed mass of said liquid chill agent and $dT^L$ is a difference between a critical temperature $T_c(P_0)$ of the at least one superconductor and an operating temperature of said liquid chill agent, $T_0(P_0)$. Since, under the boundary conditions of the invention, a vapour of the chill agent LN2 can heat up to a temperature above the critical temperature of a superconductor, $T^-$, the process to build up internal energy (eg. via an isochorus or nearly isochorous pressure increase for), release of said internal energy via $\delta dm^V_0$ into an aeropneumatic accumulator is limited to a number nc,crit of cycles dt to release $\delta dm^V_0$ per process cycle hence to a maximum allowable quantity of heat introduced ($\Sigma dQ_i$ $_{max}$==cm$^L$dT$^L$dT/V$_s$=$_c$ P$_L$*A$_L$**dh$_L$ dTV$_s$=∫ ∫ dW dn$_{c,crit}$,' wherein said mass m comprises an excess quantity of said liquid chill agent, $dm_L$=$P_L$*$A_L$*$dh_L$ with $dh_L$=($h_L$−$h_s$) above an upper height of the at least one superconductor, $h_s$, in which $dm_L$=$P_L$*$A_L$*$h_L$−$A_L$*$h_L$ PL*AL*(hL−$h_s$) assuming plane height of a given superconductor element having a volume $V_s$=$A_s$*$h_s$ immersed in m=$m_L$=$P_L$*$V_L$, where $V_L$=$A_L$*$h_L$−=$A_L$*$h_L$−$A_s$*$h_s$.

Embodiment 3

Figure 5:
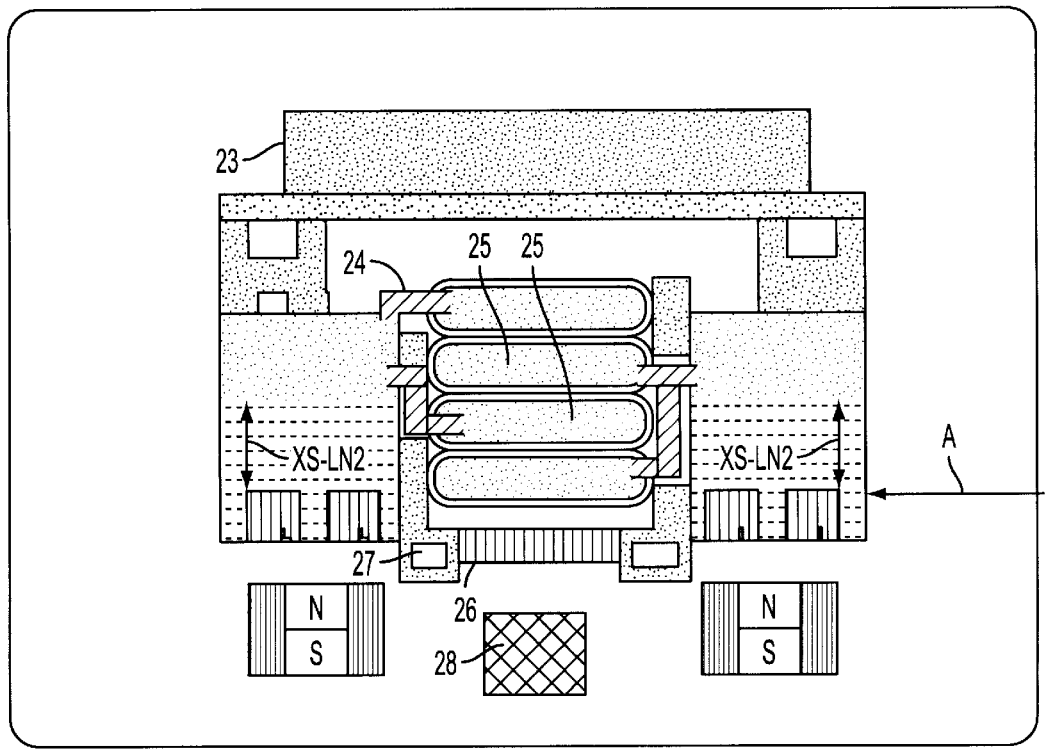
FIG. 5 Traverse section of levitation apparatus using (HT) superconductor on a track comprising two independent permanent magnets designed to operate in parallel the diamagnetism resulting from that design and transforming externally introduced heat energy via internal energy of overpressure vessel into mechanical work accommodated by an aerodynamic accumulator and possible back transfer of heat energy into an atmosphere of a given environment.

As embodiment 2, but according to FIG. 5 here using at least two closed vessel arranged opposite to each other and being bridged by the at least one aeropneumatic accumulator forming corresponding plurality 25, the at least one aeropneumatic accumulator connected via gas release gate 24 to the at least one closed vessel, the embodiment further comprising a non-magnetic electrically conducting part 26 for linear propulsion by a propulsion coil 28, said non-magnetic electrically conducting part separated from the at least one closed vessel by an unconventional insulation 27 comprising a separation distance having the external atmosphere, the resulting levitation apparatus capable of carrying goods having a relatively large volume, 23, as to the fact that corresponding load support spans the entire construction including the at least one aeropneumatic accumulator.

Embodiment 4

As embodiment 3, but according to FIG. 6 here using a plurality of at least two laterally assembled closed vessels 29, showing each having a different superconductor configuration for different operational functions and corresponding partial heat conduction, $\delta d_H$=$\delta d_{Hcon}$, 30, resulting from the different operational functions (see below in Embodiment "Internal evolutions of heat due to hysteresis losses, $\Sigma dQ_i/dt$") as well as a zipper-like arrangement of a plurality of the at least one aeropneumatic accumulator centered between two rows of the at least two laterally arranged closed vessels, 31.

Embodiment 5

Figure 7:
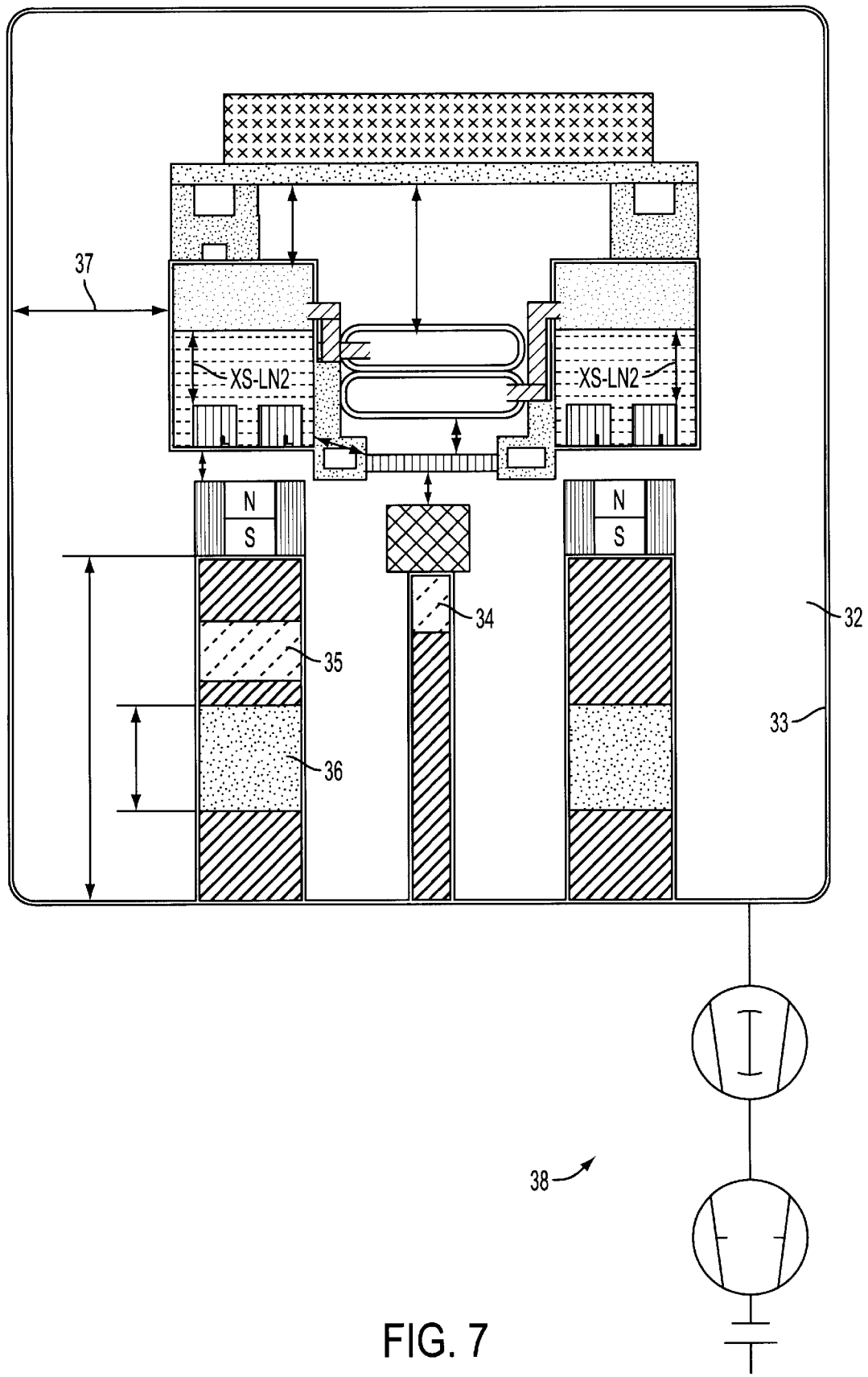
FIG. 7 Traverse section of levitation apparatus according to FIG. 1, here designed to operate in a (vacuum) chamber using a linear propulsion coil independently cooled by an external chill circuit and resulting critical heat flow distances operating under such boundary conditions.

As embodiment 4, but according to FIG. 7 showing here operating the closed vessel or the resulting superconducting magnetic levitation apparatus, respectively, in a closed such as in a vacuum chamber 33 having a(wall) temperature $T_0$ being higher than the temperature of the chill agent, $T^L_0$, and higher than the critical temperature of the superconductor, $T_c$, and to which a vacuum pump station 38 is connected. Such a process includes running said superconducting magnetic levitation apparatus in a (vacuum or overpressure) chamber having an under-or overpressure 32 relative to 1 atm of a natural environment to provide stationary process conditions which enable for the first time an operator to control an (HT) superconductor-based process, because any energy exchange with an environment within said chamber surrounding said apparatus is a variable dependent on independent variables such as said under- or overpressure inside said chamber or separation distance between the at least one closed vessel and the chamber wall, 37, surface conditions including emissivities according to claims 6, 25 and 26, for example, mean asperities and insulation including unconventional insulation systems exploring in-situwise said underpressure, for example as an artificial boundary toward a zone (eg. of said apparatus) comprising unlike thermal conditions such as the at least one closed vessel and the non-magnetic electrically conducting part for linear propulsion by the propulsion coil, here having an independent cooling system 34, as the independent cooling system 35 or an additional insulation 36 for corresponding permanent magnets, thus compensating for otherwise sharp thermal gradients toward the closed chill vessel comprising the at least one superconductor.

Embodiment 5 represent effectively a double-closed system relative to the (HT) superconductor employed under the proviso that a (vacuum or overpressure) chamber used under industrial conditions is a virtually closed system which is effectively not closed or a non-closed system, a status which can also be referred to as "quasi-closed" since a running pump effectively connects the volume of a (vacuum or overpressure) chamber with the environment surrounding said (vaccum or overpressure) chamber by air having normal conditions (1 atm and ambient temperatures or so) rather than closing it off from each other.

These considerations are important with respect to the capability to continuously run a process based on a (HT) superconductor such as a process based on a superconducting magnetic levitation apparatus in a non-adiabatic system including a (vacuum or overpressure) chamber, because a (vacuum or overpressure) chamber allows the operator to control stationary process conditions including the entity of the implicit heat flow conditions according to eq. (2). Embodiment 1 through embodiment 5 are interrelated in that the closed system of embodiment 1 allows embodiment 5 to work effectively as well as embodiment 5 allowing embodiments 1 to 4 to operate effectively and in a superior manner relative to the state-of-the-art. Eq. (1) is not explicit as to whether the process is run under adiabatic, any (other) underisothermal or isothermal conditions or conditions deviating from any of them. The analysis requires to identify sources of externally introduced heat into an (HT) superconductor-based process using one or more of the embodiments 1 through 5. An electromagnetic radiation between the continuously superconducting magnetic levitation apparatus depicted in FIG. 7 on the one hand and a wall external to a superconducting magnetic levitation apparatus could comprise significant energy transfer away from an environment to a continuously superconducting magnetic levitation apparatus. Any heat balance is thus dependent on the aforecited identification of and solution to suppress, reduce or minimize external heat transfer of the principal unit (see FIG. 7 and claims 1 and 38). in order to enable the operator to control (HT) superconductor-based processing.

(HT) Superconductor-based Processing Under Defined Boundary Conditions

Today's more performant superconductors (eg. as-cast single crystal hence anisotropic or textured YBCO$_7$ blocks or a derivative including machined geometries for more efficient use) allow to carry the chill liquid required for a given operation by a levitating closed chill vessel without the heat conduction from and the (Hitachi-type of) diffusion into an environment (which represent the most awkward heat transfers undermining equivalent progress for application of such more advanced superconductors, see above discussion of background), because their dead weight is small (nb. the dead weight is the weight of a given superconductor volume required to develop the levitation force for overcoming the gravitational force experienced by itself. The new as-cast and anisotropic single crystal YBCO superconductors have a dead weight of about 4% leaving 96% of the superconductor volume or weight to do the job). Accordingly, an application of a superconductor accomodated in a closed chill vessel, said closed chill vessel then used in a closed chamber does allow to fully control the boundary conditions of an operation exploring the intrinsic and unique properties of a superconductor. This is fully independent as to whether the atmosphere within this chamber is below 1 bar or above 1 bar. The heat balance of a superconductor in a universal application under given operating conditions (including a given environment hence excluding open chill systems comprising a superconductor and the resulting diffusion into an environment) comprises still a large number of eventually critical heat flow phenomena which are examined in the following so that a hierarchy toward optimum conditions of superconductor-based processing becomes selectable depending on the particular boundary conditions required. In a given chamber, for example, one can have radiation to be rate-controlling over convection when the chamber accomodates a high vacuum atmosphere (nb. a "chamber" atmosphere represents nevertheless the "external" atmosphere for the principal unit of the apparatus in FIG. 1 or in claim 38 and which is optionally used to run the process of claim 1), but one can also have heat convection to be rate-controlling over (electromagnetic) radiation into a closed chill vessel under a normal atmosphere or under a controlled atmosphere when having a controlled partial pressure thus concentration of species (including the suspension of a dust which can even remain stationary if a running source of dust and a running pump system employing a filter are in a dynamic equilibrium (of flow) within such a chamber), but having at the same time normal temperatures and a pressure of 1 atmosphere. This problem was addressed and taken into account by claims 25 through 27.

Embodiment "Sum of Heat Conductions $\Sigma(dQ_i/dt)=-\Delta A_i (dT_1/dl1_1)$"

with $A_i$=heat flow cross section, $\Delta$=heat conductivity and $l_i$=length of temperature difference dTi under consideration. Since the superconductor and/or the surrounding liquid chill agent such as liquid nitrogen is in principle the coolest part of the system, one wants to explore the diamagnetism for levitation even in applications in which the neglible (or measurably most often inexistant) Ohmic resistance of a superconductor is to be explored and/or of prime concern.

One has to distinguish thus from a heat conduction from a hotter environment into the chill system concerned (which is thus to be eliminated if possible by a floating situation, see HTS-based rotating applications such as the spinning wheel accomodating a LN2 tank, for example) from heat conduction of a heated chill system receiving an energy resulting from the application of a superconductor relative to a chill system having a lower temperature than the heated one. In the present invention, this is explored in a plurality of laterally arranged closed vessels being subjected to corresponding thermal non-equilibria (see claim 18). Also, one can explore a heat conduction away from a chill system relative to the superconductor under consideration when a (directly non-chilling) chill system comprises a distinct cooler temperature such as an helium based chill system compared to a HT superconductor run system chilled by liquid nitrogen. Operative heat conductions toward, i.e. into the closed chill vessel of the superconducting magnetic levitation apparatus are those (i) from the non-magnetic electrically conducting material for propulsion (ii) from the load and corresponding support.

Embodiment "Sum of Heat Convections $\Sigma(dQ_j/dt)=(dm/dt)_j cdT_j=p_jA_jv_jcdT_j$"

with $p_j,A_j$ and $v_j$=density, flow cross section and velocity of fluidum concerned. The most critical and well known heat convection yet encountered in the real life application of superconductors is the heat conduction from any environment directly to the surface of the (closed) chill vessel or container (or corresponding superconductor if no such closed vessel is used). One reason is the omnipresent thermal gradient of such a system, the other is the amount of surface area of the chill system or superconductor exposed to the relatively warm environment.

In the invention, any environmental effect on the application becomes a quantifiable variable, whether the concerned variable is a force, heat or energy gradient, resulting heat flow or inter-facial boundary condition involved. For example, heat convection is basically zero or neglible due to a closed chamber accomodating the principal unit accommodating the superconductor (see claim 38), because this chamber can provide a vacuum or other atmospheres comprising a controlled composition, pressure (one example is a pressure decrease down to $10^{-8}$ bar for a volume accommodating an atmosphere well above $10^{m3}$) and temperature as well as controlled surface areas providing a heat source relative to the superconductor chill system, i.e. completely controlled energy sources.

Embodiment "Macroscopic dewar processing". see FIG. 7

In addition, the separation distances between the internal surfaces of said chamber and the superconductor chill system can be controlled hence the intensity of heat flow from a given energy source of a given temperature and a given surface area to the chill system. Such distances are important for consideration of critical heat convections in a system comprising multiple heat convection phenomena or non-exclusible possibilities of heat convection phenomena as the system exhibited in FIG. 7. The distance between chamber wall an apparatus is the largest distance in FIG. 7, for example, but they also represent the largest heat source areas which are hence to be designed as in claim 26. Thus one wants to employ warm materials with a low heat conductivity onto the colder devices for chilling a superconductor (see claim 6.B).

The distance from a permanent magnet to a vessel to comprise a fairly small heat source area (i.e. of the permanent magnet) which in addition can be thermally insulated from relatively large heat source areas such as the walls of the above chamber accomodating the permanent magnets as is illustrated in FIG. 7, but they also show to represent the shortest distances to the superconductor chill vessel, thus corresponding distance is a critical distance and one wants to employ surfaces as to claims 25 and 26 as well as to employ an independent cooling system for the permanent magnet for levitating the principal unit (see claims 44 and 49). One solution is an integrated concept of permanent magnet and propulsion coil in which both the permanent magnet and the propulsion coil are cooled together, but independent from the superconductor chill system (claim 49). Another solution is that by using two independent cooling systems for permanent magnet and for propulsion coil, because one can then better separate the closed chill vessel with the at least one superconductor from (i) the electronically conducting material required for propulsion of the apparatus in a moving magnetic field of the propulsion coil (which is eventually the hottest part of a superconducting magnetic levitation apparatus) and (ii) from the propulsion coil itself (which is eventually the hottest part of the entire system based on a superconducting magnetic levitation apparatus).

The vacuum essentially eliminates the effect of convection. Thus one wants to create a macroscopic dewar situation in which the main sources of convection are in principle depending on the mean free path (MFP) of a surrounding (eg. external) atmosphere. The critical part remains the electrically conducting part for moving the principle unit of the superconductor based apparatus in a moving magnetic field generated by a propulsion coil for linear movement. Embodiment "Sum of Heat Radiations $\Sigma(dQ_k/dt)=\Sigma_k O_k A_k dT^4_k$,"

with $A_k$=radiation surface, $\Sigma_k$=surface emissivity or (and) absorption capacity, $O_k$=Stefan Boltzmann's constant=5.669 10-8 W m$^{-2}$ K$^{-4}$. In a system employing a levitating apparatus in a vacuum chamber or a chamber under controlled atmosphere having a pressure smaller than a low vacuum pressure, whatsoever, electromagnetic radiation becomes a or the rate-controlling macroscopic heat exchange between the closed chill vessel and/or superconductor on the one hand and the environment on the other. One wants in principle employ the conditions of claims 6A and 25. However, design considerations such as separation distances are also important and one preferes to integrated the vacuum conditions of the above macroscopic dewar situation for the entire (eg. transport) system into the insulation layers, boundaries, interfaces and separation distances comprising critical thermal gradients and which are eventually shorter than the mean free path employed (see above). Embodiment "Combined Insulations Including Unconventional Methods"

It is evident that surfaces $A_l$, $A_j$ and $A_k$ are representing a more universal variable to control the external heat flow of a superconductor in operation. Unconventional insulation which additionally or optionally employ a running pump to pump down an interspacing within a critical thermal gradient are therefor an important method for the more efficient application of superconductors. The effect on convection and radiation of the mean free path of non-condensed matter comprising a mixture of at least one element $\Sigma X_1$ wherein $X_1$ representing a controlled partial pressure of at least one element of the periodic table of the elements is taken into account by claims 6.A, 6.B, 25, 26 and 48, for example. One can also cool chamber walls or particular sections of a chamber wall of the above chamber if required. The more performing superconducting magnetic levitation apparatus uses at least one block of an as-cast single crystal superconductor of textured hence anisotropic microstructure and is eventually machined into geometries such as a annular ring, a triangle etc. for more efficient use such as in a closed chill vessel, but its application requires to better suppress environmental interaction via heat transfer by using the above combined insulations, because last but not least each stored liquid chill agent quantity represents an extra load to be carried. Application of larger levitating vehicles exploring a superconductor is hence directly depending on the above combined insulations methods, because temperature and heat source conditions can rapidly change in a more versatile transportation process. The superconducting magnetic levitation apparatus is designed to operate in such a way that heat flow from the propulsion coil and the nonmagnetic electrically conducting material toward the closed chill vessel (eg. $dH_{con\ 1}$) is smaller than the sum of heat flow from load and corresponding support plus heat convection or heat radiation toward the closed chill vessel.
Embodiment "Internal Evolutions of Heat Due to Hysteresis Losses, $\Sigma dQ_1/dt$)"

The use of a chamber to provide a controlled atmosphere surrounding a superconducting magnetic levitation apparatus is a convenient solution to decouple (A) the effect of introduction of heat from an environment including the volume of a vacuum chamber (independent on a temperature needed to keep the superconductor in a superconducting hence artificially chilled temperature state) from (B) the effect of introduction of heat from a process step internally from a superconductor into the chill agent (see below), because one can even employ the diffusion method of chilling a superconductor as disclosed by Hitachi, but in a controlled manner (see claim 14) without an uncontrolled mixing of a released storage gas mass with a natural environmental atmosphere. The present invention provides a control mechanism to eventually remove said released storage gas mass from an environment of the superconducting magnetic levitation apparatus by a pump system. The present invention uses indirect evaporation of a liquid chill agent into the volume of said chamber by way of controlled intervals of time (represented by triggering the gas outlet valve of the aeropneumatic accumulator periodically (or of the closed vessel if no such accumulator was used)). Such a cooling principle does provide a more effective cooling system since one has in fact a high degree of freedom in the design of the loading capacity of liquid chill agent per vehicle, because one can run corresponding process beyond a critical time where external supply of liquid chill agent was required, i.e. where the loading capacity of the vehicle is directly coupled to the critical time threshold of external liquid shill agent supply. Proof: U.S. Pat. Nos. 5,287,026 and 5,375,531 only disclose levitation times of superconducting pieces, fragments, tablets etc. plus a frame, but they do not disclose an effective levitation time of their (over) simplified levitation apparatus plus a load. However, a levitation time of a superconducting magnetic levitation apparatus to be used in a process would in any case require to design the at least one superconductor in such a way that an additional load such as a conveyance load can be conveyed over a distance ds. A process involving a levitation requires thus an extra effort compared to a superconducting magnetic levitation apparatus designed for levitation of its own weight alone (though one can hardly imagine a load such as a fragile porcellaine to be transported on the disclosed uninsulated loading frame by U.S. Pat. Nos. 5,287,026 and 5,375,531). The comparison of prior art discussed in U.S. Pat. Nos. 5,287,026 and 5,375,531 and the claims of U.S. Pat. Nos. 5,287,026 and 5,375,531. reveals the depth of corresponding invention.

Vertical Inhomogeneities of a Magnetic Field, $\delta(dB/dy)/\delta(dO_1Q_1)$

Whenever a load is loaded onto a levitating superconducting magnetic levitation apparatus, corresponding loading moves the at least one superconductor hence said apparatus down to higher field line intensity of the external magnetic field of the at least one permanent magnet applied to the at least one superconductor, i.e. the effective diamagnetization moves along corresponding hysteresis curve of corresponding superconductor and this results in a energy loss or a so called "hysteresis loss". The superconductor then experiences effectively an inhomogeneity of the applied field though the field itself may well be stationary, i.e. $\delta(dB/dy)/\delta t=0$.

Assuming that a superconducting magnetic levitation apparatus following the present invention develops a levitation force $F_y$ of 5000 N by using the at least one superconductor in a plurality of closed vessels (see claim 17). Assuming 4% dead weight, 130 kg weight of said apparatus and 125 kg liquid nitrogen required for a carrying a load in a long term operation. The resulting conveyance mass which can actually be transported over this period then amounts to 252 kg. It is evident that lifting and depositing such a weight will impose a significant change to the effective magnetic field experienced by the at least one superconductor. What matters here is that there is no local overheating above corresponding critical temperature, $T_c$. This is best done, however, by using the present invention since it avoids exposure of the at least one superconductor to an environment of undefined conditions.

Figure 9:
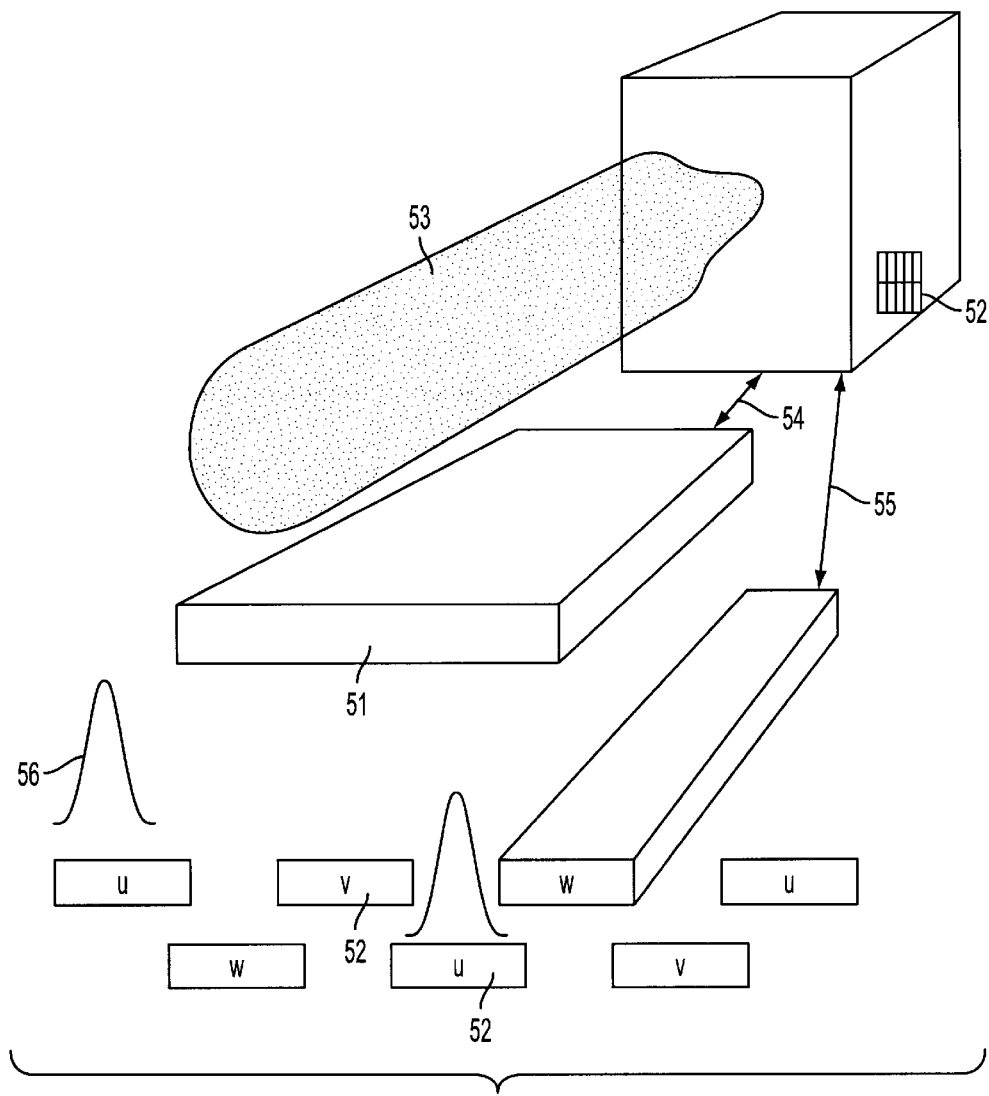
FIG. 9 Showing critical distance between linear propulsion coil 50 or non-magnetic electrically conducting part of levitation apparatus, 51, on the one hand and closed vessel to accommodate superconductor, 52, on the other hand i.e. $54^1{}_{1Crit}$ and $55^1{}_{2crit}$, respectively. An aeropneumatic accumulator 53 is also indicated. 56: migrating magnetic field.
Figure 10:
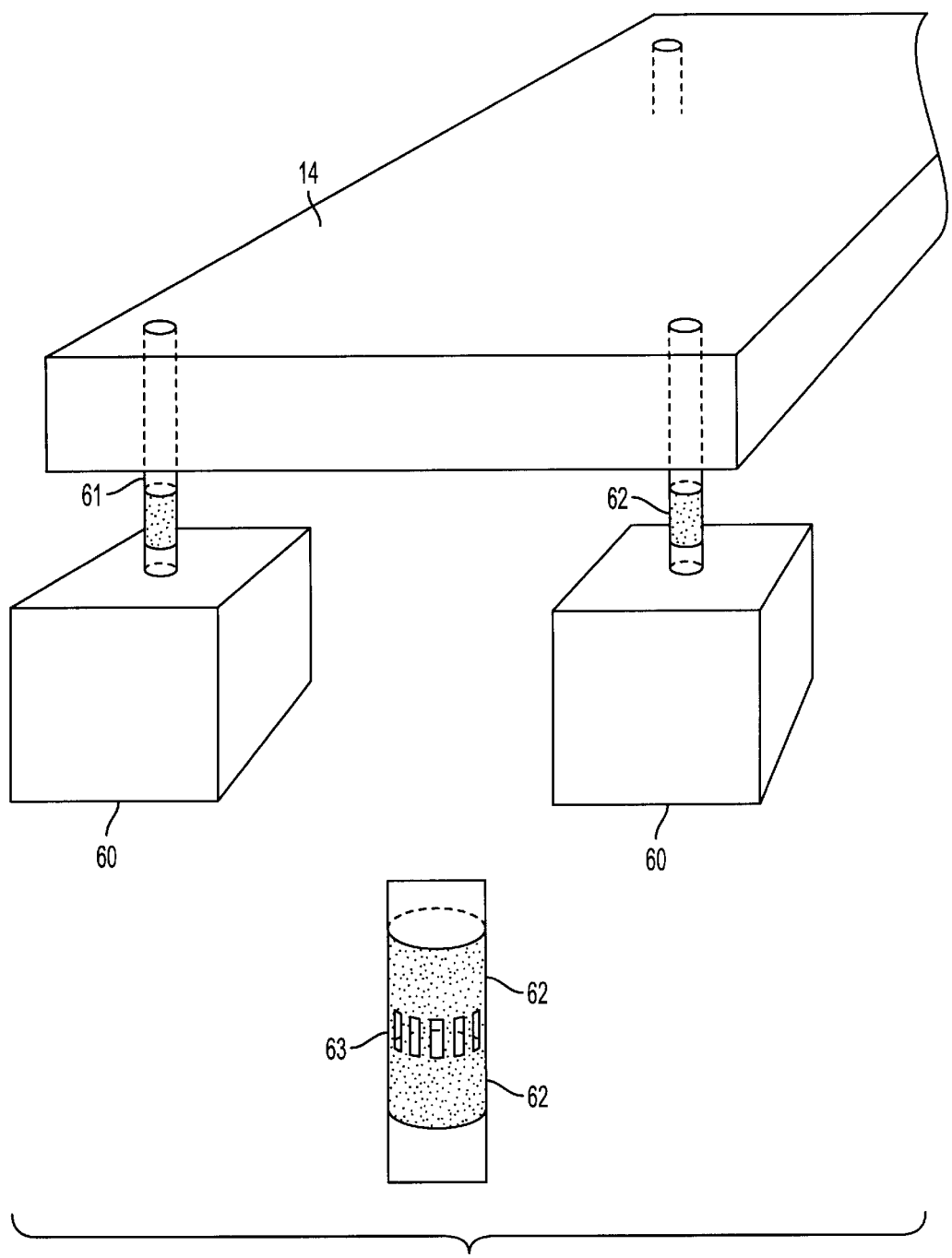
FIG. 10 Rotatable overpressure dewar 60 or accommodation of superconductors immersed in a liquid chill agent, said rotating overpressure dewar fixed around a pivot 61 the axis of symmetry or center line of which following a track of a permanent magnet for minimum friction and reduced evolution of heat caused by flux creep in said superconductor compared to rigid overpressure dewar on the same track. Detail of rotatable rods with thermally insulating massive sections 62 and small rods 63 accommodating external atmosphere to reduce heat conduction from relatively warm load support 14 to relatively cold dewar or closed vessel.
Figure 11:
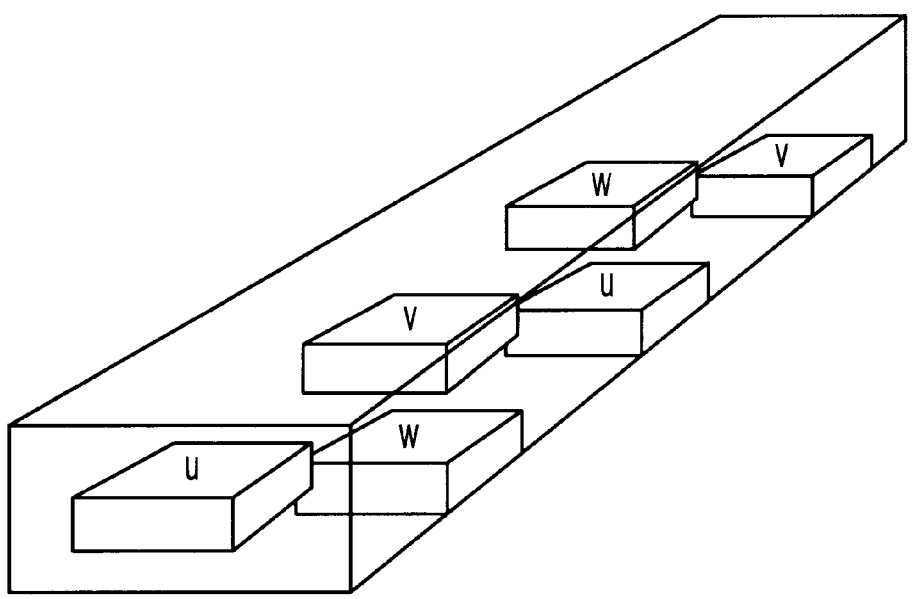
FIG. 11 Propulsion coil 71 for linear propulsion of levitation apparatus of FIGS. 1 and 5 through 7, here accommodated in a box 72 to reduce surface area and thermal gradient exposed to a vacuum atmosphere, for example.

Longitudinal Inhomogeneities of a Magnetic Field, $\delta(dB/dx/\delta t\, dy\, (dO_1-dO_2)$ However, the external magnetic field may become instationary due to oscillations resulting from the migrating field of the propulsion coil (cf. FIG. 9) for creation of a linear propulsion force, $F_0$, and being sustained by the at least one superconductor through interaction of the moving field with the stationary field of the at least one permanent magnet for levitation.

Figure 4:
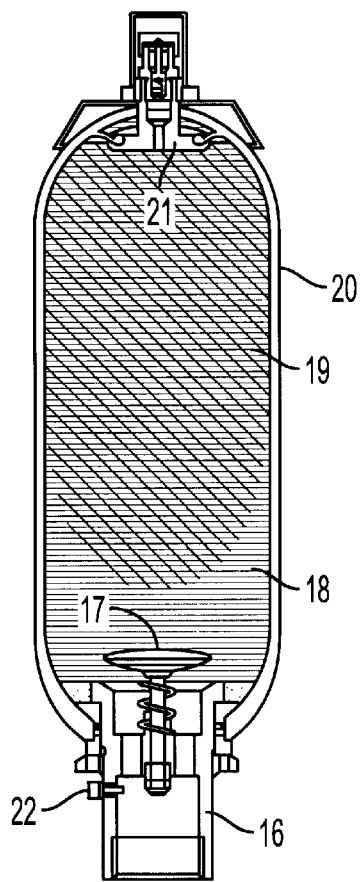
FIG. 4 Aerodynamic accumulator used to accommodate mechanical work $\int \int \int d^3W$ introduced by overpressure closed vessel or dewar (which accommodates the at least one superconductor immersed in a liquid chill agent such as liquid nitrogen following FIG. 1), by way of $\delta dm^V_0$ released.
Figure 6:
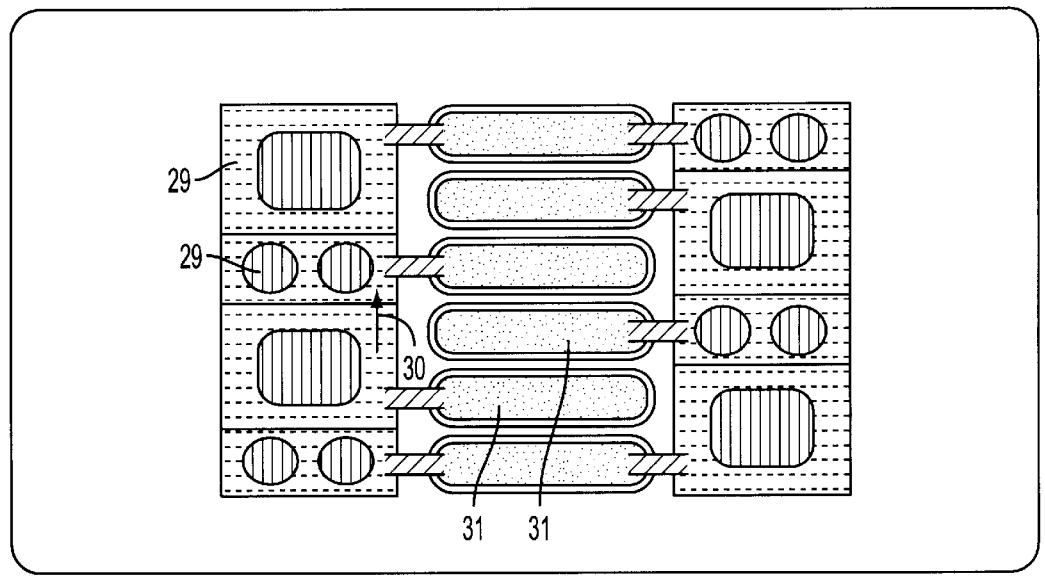
FIG. 6 Cross section alternative of levitation apparatus at a view A according to FIG. 5 showing plurality of overpressure dewar and aerodynamic accumulators, the former accommodating at least one superconductor element of cylindrical or other shaped discs, or of rectangular, quadratic or irregular cubes, the plurality of aeropneumatic accumulators being designed to receive a storage gas atmosphere from the plurality of closed vessels in a zipper-like arrangement of adjacently in parallel assembled individual aeropneumatic accumulators.

A convenient solution to this problem is afforded by the present invention in that the increased loading capacity of a corresponding superconducting levitation apparatus as is depicted in FIGS. 4 through 6 does allow to design sufficiently large derivatives comprising sufficiently large separation distances between coil or non-magnetic electrically conducting part of said apparatus on the one hand and the at least one closed vessel comprising the at least one superconductor on the other so allowing for minimum interaction of coil propulsion and permanent magnetic field even when large permanent magnets or large propulsion forces are required.

Longitudnal oscillations of said apparatus as a result of an external (mechanical) impact such as by another levitation apparatus following said apparatus in a common batch process, for example, are most conveniently compensated for by employing a variety of superconductor geometries and superconductor arrangements counteracting such external forces. In the present invention, separate chill conditions afforded by closed chill vessels for damping functions coexisting with closed chill vessels primarily designed to provide levitation forces rather than damping forces are the best solution to this problem as they afford independent control functions for independent process variables and vice versa. Both type of chill vessels coexist in a plurality of closed vessels as to claim 17 for which individually run aeropneumatic accumulators provide long term working conditions.

Figure 8:
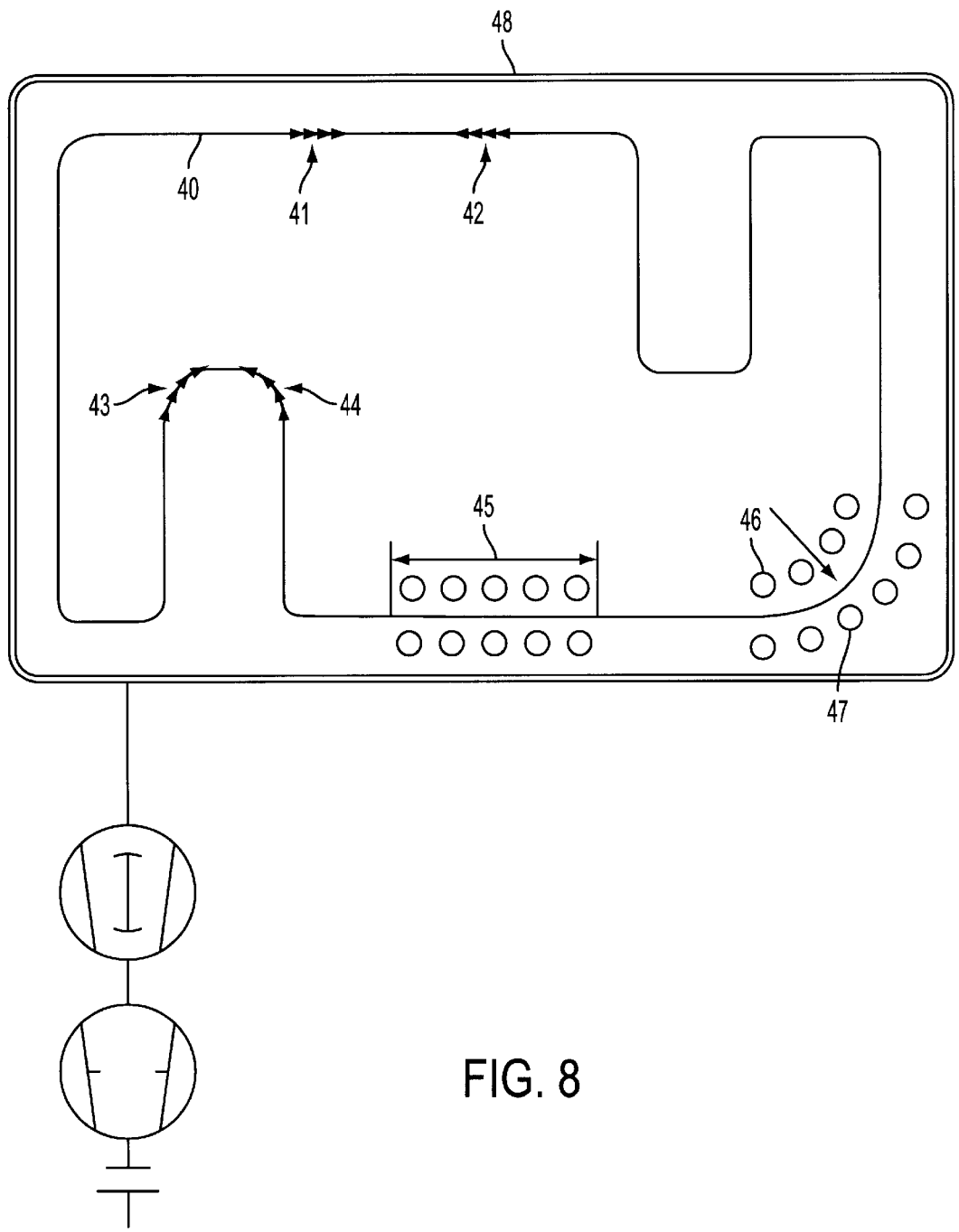
FIG. 8 Schematic to illustrate effect of inhomogeneities of a magnetic field causing heat in a levitating superconductor traversing said inhomogeneities by a linear such as a horizontal movement as indicated. 40 overall horizontal permanent magnet track having decreasing slope 41 and increasing slope 42, both on a linear section, and increasing slope in a curve 43 and decreasing slope in a curve 44, where a unit length of said track, $l_0$=2Ilr, 45, comprises a magnetic flux of B=5 T, while this is B=(6/4) 5 T, for example, for an internal section of a curve having radius said unit length of radius r, 46, and B=(4/6) 5 T for an external section of said curve having radius said unit length of radius r, 47. 48=chamber (eg. vacuum chamber).

Lateral Inhomogeneities of a Magnetic Field, $\delta(dB/dz)\delta t$ $(dO_1-dO_3)$ Lateral inhomogeneities of a magnetic field, $\delta(dB/dz)\delta t$ of The at least one permanent magnet arise, however, whenever a superconducting magnetic levitation apparatus traverses a curvature, i.e. when a movement of said apparatus through a curve of a track of the above at least one permanent magnet results, because of a change of density of magnetic field lines per unit length of the at least one permanent magnet on either side of the at least one permanent magnet as is demonstrated in FIG. 8. The problem even increases as the size of the apparatus increases, either. However, there is no limitation in design for the process provided by the invention as it easily allows for solutions such as provided by claim 50.

One can also have lateral oscillations due to an external mechanical impact to said apparatus. In both examples, however, the magnetic field of the permanent magnets is stationary and complementary design solutions are always better applicable for a larger apparatus and in a controlled atmosphere as they allow to employ additional devices for external damping (one wants to employ damping of lateral forces $F_z$ including oscillations resulting from impingement of a force on a floating apparatus). The essence of the Hitachi apparatus is disclosed to be limited to an enhanced lateral stability of floating bodies by the introduction of counterpolarized permanent magnet composites providing sharp dB/dz gradients and without providing a solution to the more principal problem of flux creep in a superconductor resulting from the movement of field lines while being traversed from a magnetic field of the at least one permanent magnet (causing frictional heat at pinning centers). What universally matters here is the damping capacity of the superconductor hence state control of the at least one superconductor so to assure efficient application of both superconductor and permanent magnet as is afforded the at least one closed vessel of the invention and the resulting controlled release of a partial chill gas mass. This can not be done by an increase in gradient dB/dz toward infinite but by the present invention. Since critical operation time thresholds are always directly coupled to the loading capacity and since one has an increasing field gradient dB/dz with increasing size of the apparatus hence increasing weight anyway, the concept of employing dB/dz gradients is thus in particular limited to small loads and trivial process functions hence consequently not assigned to represent a processing of relevant importance in real life and working conditions.

Constitutional Equation of the Process

When the chill vessel is closed during a corresponding superconducting operation, one has the following overall heat balance inside the closed chill vessel comprising the at least one superconductor:

$$\left(\sum dQ_i + \sum dQ_j + \sum dQ_k + \sum dQ_1\right)/dt = \quad \text{eq. (6)}$$
$$d\left(c_p \int\int dT_o^L dm_o^L + \Delta Hv + c \int\int dT_o^V dm_o^V + \right.$$
$$\left. dh_{con} + Rs \int\int\int dm_o^V dT_o^V dV_o^V / V_v^V / O_o^V\right) dt$$

When the chill vessel is opened to release a partial chill gas mass, one has the following energy change for the closed chill vessel comprising the at least one superconductor and assuming adiabatic conditions during release of said chill gas mass into an external atmosphere or into an aeropneunatic accumulator:

$$-\delta\left(\sum dQ_i + \sum dQ_j + \sum dQ_k + \sum dQ_1\right)/\delta t = \quad \text{eq. (7)}$$
$$-\delta dE / \delta t$$
$$\delta\left(c_v \int\int dT_o^V dm_o^V + Rs \int\int\int dm_o^V dT_o^V dV_o^V V_o^V\right) / \delta T$$

and resulting overall in the following non-equilibrium energy transfer per process cycle for underlying a long term superconductor-based process:

$$\delta\left(\sum dQ_i + \sum dQ_j + \sum dQ_k + \sum dQ_1\right)/(\delta t)^2 = \quad \text{eq. (8)}$$
$$\delta\left(c_p \int\int dT_o^L dm_o^L + \Delta Hv + + dH_{con} + \right.$$
$$c \int\int dT_o^V dm_o^V + Rs \int\int\int dm_o^V dT_o^V dV_o^V / V_v^V /$$
$$(1 - \delta/\delta t = $$
$$\delta\left(c_p \int\int dT_o^L dm_o^L\right)\delta t + $$
$$\delta \Delta Hv / \delta t + \delta dH_{con} / \delta t$$

The latter equation assumes that there is a thermal lag after opening the closed vessel by the at least one valve for adopting an equilibrium between the temperature of the chill gas atmosphere on the one hand and the temperatures of the liquid chill agent and the at least one superconductor and the vessel material of corresponding vessel on the other hand (as for a sudden heating of a superconductor due to an anomalous loading of a superconducting magnetic levitation apparatus, see claim 13). At the same time, one has to take into account that the partial chill gas mass accomodated in a previous process cycle is subjected to certain process conditions.

Overall, mechanical work can be produced by the chill gas atmosphere in a variety of forms:

deforming wall of vessel expanding into a neighbouring environment or vessel expanding into the aeropneumatic accumulator and moving, deplacing or deforming a wall of said aeropneumatic accumulator.

Accordingly, metallic materials of high ductility and of high fracture toughness, heat conductivity and zero emissivity (absorption capacity) as well as welding procedures which do not deteriorate corresponding properties such as carrying out the welding procedure under a controlled and protective atmosphere to avoid accomodation of impurities such as oxygen in a copper based structural material, for example (see claims 40, 41 and 46), are among the prime options to carry out the fabrication of corresponding devices employed.

The process is controlled by controlling $\delta dE$ during $\delta t$ (see FIG. 12). After rearranging eq.s (1) and (7) following $$-\partial dE/\partial t = \hat{o}(c^- m''ofdT'o+R5\ m^{-'}O\ T''O\ fdV''O\ IV''O)/\partial t \quad \text{eq. (9)}$$

integration of the right hand side (RHS) of eq. (9) and using the general state equation (BoyleMariotte's law) for m=const., i.e. (PV)/T=const. in order to replace T and $R_s = c_p - c_V$ and the adiabatic exponent $k = c_p/c_V$ yields the required coefficient n>1 numerically and one obtains the relationship $PV^n$=const. for a given set of boundary conditions of processing the energy state of the superconductor under consideration or vice versa (i.e. the boundary conditions required for a given polytropic coefficient employed) (cf. FIGS. 12 vs. 2):

$$[P_{0(2)}V_{0(2)}\ \text{of}\ dt(1)]^n = [P_{0(1)}V_{0(1)}\ \text{of}\ dt(2)]^n \quad \text{eq. (10)}$$

The universal relationships employing these boundary conditions are provided by claims 2 through 5. They include the possibility to further differentiate the constitution of the chill system of the claimed process including the superconducctor employed beyond the illustrations shown in FIGS. 12 and 13. Claims 9 through 16 provide further details to run the actual underisothermal release of the partial chill gas mass.

Figure 13:
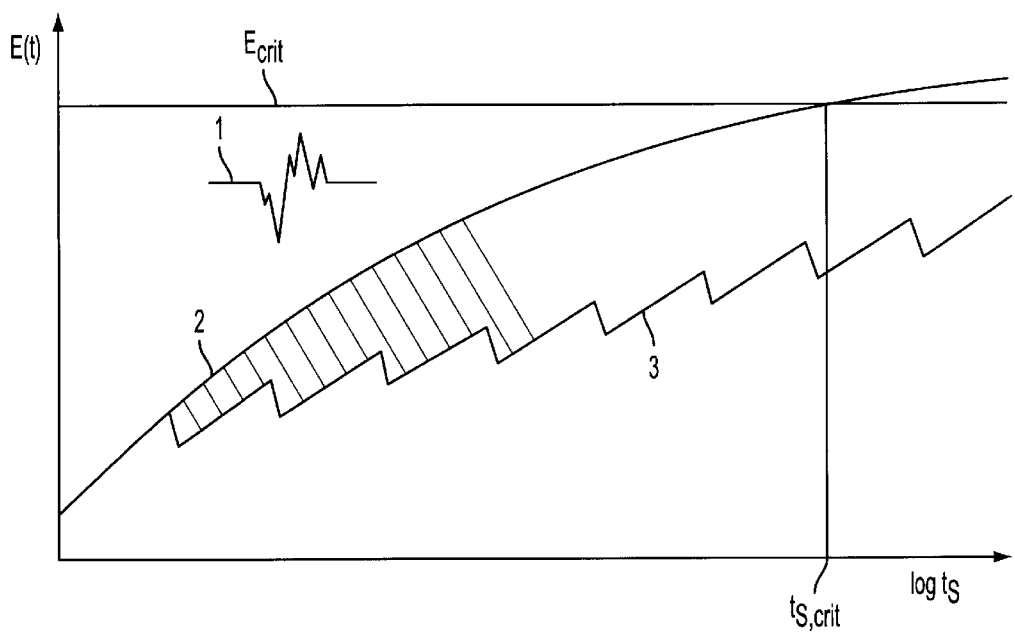
FIG. 13 Showing graphically the control of operating time of a superconductor-based process by controlling the energy state of a superconductor in a closed vessel by (curve 3) repeatedly releasing stepwise a partial chill gas mass resulting from evaporation in said closed vessel of a liquid chill agent to maintain a superconducting state of said superconductor.

FIG. 13 shows schematically a resulting control of operating time of a superconductor-based process such as can easily be employed in a vacuum transport system or along a translation in the space of a clean room. The qualitative comparison includes the energy balance of a superconductor-based carrier system of a given loading capacity as a function of operating time ts for (curve 1) an open chill system following state-of-the-art and which is unsuitable for application in a vacuum (nb. oscillations indicate the effect of free fall and impact of liquid nitrogen droplets onto a heat sink support for superconductor materials and the resulting uncontrolled evaporation and even explosion of nitrogen into an open atmosphere; for the sake of clarity, time dependence was assumed to follow an arbitrary scale for curve 1). Curve 2 represents the energy content of a closed pressure vessel of a carrier system (see FIG. 1) without release of a partial chill gas. Curve 3 shows corresponding energy content by employing the invented method of a stepwise release of a partial chill gas mass from a closed pressure vessel such as of a transport vehicle. The chill gas mass is expected to be accomodated by the internal atmosphere of a vacuum chamber (recipien)t, a clean room or by one or more aeropneumatic accumulators, wherein the vacuum chamber is subjected to continuous evacuation by a pumping speed S of a (vacuum) pump station comprising at least one pump or vacuum pump (see FIGS. 1, 7 and 8). The effect of this release on maximum operating time $t_{S,crit}$ (which can be a security limit relative to an hypothetical failure of the vessel material due to undue increase of pressure of the chill gas atmosphere inside said vessel) is qualitatively indicated by the hatched area. The slope of the function E(t) of curve 3 shows higher energy accommodation rates than for any other method of linear transport. The linear transport method based on the invented method to process the energy state of at least one superconductor offers a significantly increased performance over the state-of-the-art linear transport including significantly extended operating periods $t_{S,crit}$ over those levitation-based methods which would not employ a partial energy release by underisothermally (i.e. overadiabatically, adiabatically and underadiabatically) removing a partial chill gas from the chill system. The stepwise release of heat energy following curve 3 represents a partially reversible reduction of energy content until the liquid chill agent in the pressure vessel (see FIG. 1) has been consumed away.

What is claimed is:

1. A process based on application of a superconductor to an external force generated by a field selected from the group consisting of an electric field, a magnetic field, an electromagnetic field and a gravitational field, and by a change of said field with time, said process comprising processing an energy state of at least one superconductor by evaporating a chill gas atmosphere from a liquid chill agent in at least one closed vessel having at least one valve, wherein the at least one closed vessel is designed to accommodate an energy dE resulting from an application of the at least one superconductor in a superconducting state during at least one time interval of a process cycle, dt, wherein the at least one time interval of said process cycle comprises accommodating said energy dE by a heat capacity of a mass of one or more of the following constituents:

(A) said chill gas atmosphere stemming from evaporation of said liquid chill agent, (B) said liquid chill agent used to chill the at least one superconductor, and (C) the at least one superconductor, wherein the at least one superconductor comprises at least one superconductive material, and increasing pressure of said chill gas atmosphere in the closed vessel followed by releasing stepwise at least a partial quantity of said energy, $\delta dE$, via an underisothermal release of a partial chill gas mass, $\delta dm_0^V$, from said chill gas atmosphere through the at least one valve during an operating time interval, $\delta t$.

2. The process according to claim 1, further comprising accommodating said energy, dE, by one or more of the following:

(A) by an enthalpy $dH^L = \int c_p m_0^L\ dT^L$ of a liquid chill agent mass, $m_0^L$, having a heat capacity, $c_p$, wherein $dH^L_0$ increases via increasing an initial liquid chill agent temperature, $T_{0(1)}$ to a resulting liquid chill agent temperature, $T^L_{0(2)},$ by an amount $dT^L = T^L_{0(2)} - T^L_{0(1)}$ wherein $T^L_{0(2)}$ is below a critical temperature $T_c$ of the at least one superconductor, (B) by an enthalpy $dH^s_0 = \int c_p m^S dT^s$ of a superconductor mass, $m^s$, having a heat capacity, wherein $dh^s_0$ increases via increasing an initial superconductor temperature, $T^s_{0(1)}$, to a resulting superconductor temperature, $T^s_{0(2)}$, by an amount $dT^s = T^s_{0(2)} - T^s_{0(1)}$ wherein $T^s_{0(2)}$ is below a critical temperature $T^c$ of the at least one superconductor, (C) by an evaporation energy $dU_V = \int_\Delta U_V(A_{Int}) dm_0^L$ for generating within the at least one closed vessel an evaporation reaction of a partial quantity $dm_0^L$, of said liquid chill agent having an evaporation energy per interface surface area with said chill gas atmosphere, $_\Delta U_V(A_{Int})$, wherein said evaporation energy decreases an initial liquid chill agent mass, $m^L_{0(1)}$, to a resulting liquid chill agent mass, $m^L_{0(2)}$ by an amount $m^L_{0(1)} = m^L_{0(2)} - m^L_{0(1)}$, wherein $m^L_{0(2)}$, is limited to above a critical mass $m^L_{0(c)}$ of said liquid chill agent below which the at least one superconductor is started to be exposed to said chill gas atmosphere.

3. The process according to claim 2, further comprising evaporating a partial quantity $\delta m_0^L$ of said liquid chill agent into a partial quantity $\delta m_0^V$ of said chill gas atmosphere within the at least one closed vessel by one or more of the following:

(A) by increasing a chill gas pressure of said chill gas atmosphere, $P_{0(1)}$, by a pressure increase $dP_0 = -(P_{0(1)} - P_{0(2)})$ wherein $dP_0$ is monitored by a sensor for deformation so that $P_{0(2)}$ remains below a critical pressure $P_0$ to avoid failure by exceeding a maximum tensile or compressive yield strength of a design of the at least one closed vessel, $O_{y,max}$ or $_{0cymax}$, (B) by increasing a chill gas volume of said chill gas atmosphere, $V^V_{0(1)}$, by a volume increase $dV^V_0 = (VV_{0(1)} - V^V_{0(2)})$, wherein $dV^V_0$ is monitored by a sensor for deformation so that $V^V_{0(2)}$ remains below a critical volume $V^V_c$ to avoid failure by exceeding a maximum deformation or elongation of a design of the at least one closed vessel, $(dE/EO)_{max}$, (C) by increasing a chill gas temperature of said chill gas atmosphere, $T^V_{0(1)}$, by a temperature increase $dT^V = -(T^V_{0(1)} - T^V_{0(2)})$, wherein $dT^V$ is monitored by a thermocouple to avoid that $T^V_{0(2)}$ exceeds a critical temperature $T^c$ of the at least one superconductor.

4. The process according to claim 1, further comprising increasing an internal energy $U_0(P_0, V_0)$ of said chill gas atmosphere by one or more of the following:

(A) by an internal energy increase $dU_0(P_0, V_0) = \int c_V T^V dm_0^V$ via increasing an initial chill gas mass, $m^V_{0(1)}$, to a resulting chill gas mass, $m^V_{0(2)}$, of said chill gas atmosphere having a heat capacity, $c_V$, by a chill gas mass increase, $dm^V_{0(2)=b} m^V_{0(2)}$ Of said chill gas atmosphere, wherein resulting chill gas mass is limited to below a critical mass, $M^V_{0(2)}$, above which the at least one superconductor is started to be exposed to said chill gas atmosphere, (B) by an internal energy increase $dU_0(P_0, V_0) = \int c_V m_0^V dT^V$ via increasing an initial chill gas atmosphere temperature, $T^V_{0(1)}(P_{0(1)}, V_{0(1)})$, to a resulting chill gas atmosphere temperature, $T^V_{0(2)}(P_{0(2)}, V_{0(2)})$, of said chill gas atmosphere having a heat capacity, $c_V$, by a temperature increase $dT^V = -[T^V_{0(1)}(P_{0(1)}, V_{0(1)}) - T^V_{0(2)}(P_{0(2)}, V_{0(2)})]$, wherein $T^V_{0(2)}(P_{0(2)}, V_{0(2)})$ is limited during an overisothermal including adiabatic and isochorous chill gas pressure increase, $dP_0(dT^V)$ to below an operating critical temperature of the at least one superconductor, $T_c(P_0, V_0)$.

5. The process according to claim 1, further comprising limiting an internal energy increase of said chill gas atmosphere, $d^2U_0(P_0, V_0) = \int \int (c_V/V_s) dm_0^V dT^V$, having a heat capacity for a given volume superconductor, $(c_V/V_s)$, within the at least one closed vessel by a temperature increase $dT^V = [T^V_{0(1)}(P_{0(1)}, v_{0(1)}) - T^V_{0(2)}(P_{0(2)}, V_{0(2)})]$ and a chill gas mass increase, $dm_0^V = m^V_{0(2)} - m_{0(1)}$, of said chill gas atmosphere to below a critical mechanical work $dW_{Ocrit} = \int \int P_0 d^V P_{Ocrit} + V_0 dP_{Ocrit}$, causing a deformation of the at least one closed vessel, wherein said temperature increase $dT^V$ and said partial quantity increase $dm_0^V$ are monitored by using at least one thermocouple and at least one sensor for dilatation or at least one sensor for compression, respectively, and $dV^L_0 = dV^V_0 - dV^L$ with $dV^L = V^L_{0(2)} - V^L_{0(1)}$ comprising an initial liquid chill agent volume, $V^L_{0(1)}$), and a resulting liquid chill agent volume, $V^L_{0(2)}$.

6. The process according to claim 1, wherein the energy dE is selected from the group consisting of a radiation energy $\Delta E_{Rad}$ and a convection energy from the at least one vessel, $\Delta E_{-con}$ wherein said radiation energy or said convection energy was received from an environment or from an environmental object or from an object in a vicinity of the at least one closed vessel, wherein the at least one closed vessel is designed to be operated by a reflection of said radiation energy or an insulation from said convection energy via one or more of the following:

(A) comprising a smooth external surface selected from the group consisting of a polished surface, a white surface, a metallic surface and a brilliant surface, (B) comprising an insulating coating selected from the group consisting of a dewar, a polystrene coating, a polyurethane coating, a polyethylene coating, a nitrile, a butyl, a neopren, a natural rubber, an ethylene-propylene, a wool, a foam and a ceramic.

7. The process according to claim 1, further comprising accommodating a deformation enthalpy $\Delta H_{Def}$ by a vessel material of the at least one closed vessel, wherein the at least one closed vessel is designed to be operated by a sensor recording one or more of the following:

(A) accommodating stress of an elastic deformation by having a low modulus of elasticity and a high tensile or compressive yield strength of the vessel material, (B) accommodating stress and strain of a plastic deformation by having a high maximum strength and a high ductility of the vessel material.

8. The process according to claim 1, further comprising accommodating said energy, dE, by a deformation of the vessel material of the at least one closed vessel, wherein the at least one closed vessel is designed to be operated by a sensor recording one or more of the following:

(A) reducing a deformation energy $AH_{Def}$ by an inflatable vessel material, (B) accommodating an increasing chill gas volume of said chill gas atmosphere, $\delta V_0$, by a high ductility of the vessel material, (C) accommodating an increasing chill gas pressure of said chill gas atmosphere, $\delta P_0$, by a high maximum strength of the vessel material, (D) relaxing an effect afforded by an increasing chill gas temperature of said chill gas atmosphere, $\delta T_0$, by a high thermal conductivity or a high emissivity of the vessel material or a coating on the vessel material.

9. The process according to claim 1, further comprising releasing said partial chill gas mass of said chill gas atmosphere into a storage atmosphere via said valve, wherein said valve is designed to be operated by an actuator by one or more of the following:

(A) by increasing an initial pressure differential $(dP/dx)_{0(1)}$ between an initial chill gas pressure of said chill gas atmosphere, $P_{0(1)}$, and a storage atmosphere pressure of a storage atmosphere of at least one aeropneumatic accumulator, $P_1$, wherein said initial pressure differential $(dP/dx)_{0(1)}$ has a pressure difference between said an initial chill gas pressure and said storage atmosphere pressure, $dP=P_{0(1)-P1}$, wherein said valve is triggered to be openend by a sensor recording when said initial pressure differential $(dP/dx)_{0(1)}$ reaches a programmed or critical pressure differential across said valve, $(dP/dx)_{crit}$, wherein said programmed or critical pressure differential has a critical pressure difference between said chill gas pressure and said storage atmosphere pressure, $dP=P_{0(2)-P1}$, (B) by increasing an initial pressure differential $(dP/dx)_{0(1)}$ between an initial chill gas pressure of said chill gas atmosphere, $P_{0(1)}$ and a storage atmosphere pressure of a storage atmosphere of at least one aeropneumatic accumulator, $P_{1(1)}$, to a programmed or critical pressure differential across said valve, $(dP/dx)_{crit}$, wherein said valve is triggered to release a partial chill gas mass $\delta dm_0^V(P_{0(2)})=\delta(-(m^V_{0(1)}-m^V_{0(2)})$ when said initial pressure differential $(dP/dx)_{0(1)})$ reaches said programmed or critical pressure differential across said valve, $(dP/dx)_{crit}$, and by closing said valve when a pressure equilibrium $dP_{equil}$ reached, wherein said pressure equilibrium $dP_{equil}$ comprises a relaxed chill gas having pressure $P_{0(3)}$ and a compressed storage atmosphere having pressure, $P_{1(2)}$, (C) by increasing an initial pressure differential $(dP/dx)_{0(1)}$ between an initial chill gas pressure of said chill gas atmosphere, $P_{0(1)}$ and a storage atmosphere pressure of a storage atmosphere of at least one aeropneumatic accumulator, $P_{1(1)}$, to a programmed or critical pressure differential across said valve, $(dP/dx)_{(crit)}$, wherein said valve is triggered to release a partial chill gas mass $\delta dm_0^V(P_{0(2)})=\delta(-(m^V_{0(1)}-m^V_{0(2)})$ adiabatically when said initial pressure differential $(dP/dx)_{0(1)}$ reaches said programmed or critical pressure differential across said valve, $(dP/dx)_{(crit)}$, and by closing said valve when a pressure equilibrium $dP_{equil}$ is reached, wherein said pressure equilibrium $dP_{equil}$ comprises an undercooled chill gas having pressure $P_{0(4)}$ and a heated storage atmosphere having pressure, $P_{1(3)}$.

10. The process according to claim 1, further comprising releasing said partial chill gas mass of said chill gas atmosphere into a storage atmosphere via said valve, wherein said valve is designed to be operated by an actuator by one or more of the following:

(A) by increasing an initial chill gas atmosphere volume, $V_{0(1)}$ to a programmed or critical chill gas atmosphere volume, $V_{01(crit)}$ wherein said valve is triggered to be openend by a sensor recording when said chill gas atmosphere developes said programmed or critical chill gas atmosphere volume, $V_{0(crit)}$, (B) by increasing an initial chill gas atmosphere volume, $V_{0(1)}$ to a programmed or critical chill gas atmosphere volume, $V_{0(crit)}$, wherein said valve is triggered to release a partial chill gas mass $\delta dm_0^V(V_{0(crit)})=\delta(-(m^V_{0(1)}-m^V_{0(crit)})$ when said chill gas atmosphere developes said programmed or critical chill gas atmosphere volume, $V_{0(crit)}$, and by closing said valve when a relaxed chill gas volume $V_{0(3)}$ is reached, (C) by increasing an initial chill gas atmosphere volume, $V_{0(1)}$, to a programmed or critical chill gas atmosphere volume, $V_{0(crit)}$, wherein said valve is triggered to release a partial chill gas mass $\delta dm_0^V(V_{0(crit)})=\delta(-(m^V_{0(1)}-m^V_{0(crit)})$ adiabatically when said chill gas atmosphere developes said programmed or critical chill gas atmosphere volume, $V_{0(crit)}$, and by closing said valve when an undercooled chill gas having volume $V_{0(4)}$ is reached, (D) by increasing an initial chill gas atmosphere volume, $V_{0(1)}$ to a programmed or critical chill gas atmosphere volume, $V_{0(crit)}$ wherein said valve is triggered to release a partial chill gas mass $\delta dm_0^V(V_{0(crit)})=\delta(-(m^V_{0(1)}-m^V_{0(crit)})$ into at least one aeropneumatic accumulator storage atmosphere, wherein said valve releases a partial chill gas atmosphere mass $\delta dm_0^V(V_{0(crit)})=\delta(-(m^V_{0(1)}-m^V_{0(crit)})$ adiabatically, and by closing said valve.

11. The process according to claim 1, further comprising releasing said partial chill gas mass of said chill gas atmosphere into a storage atmosphere via said valve, wherein said valve is designed to be operated by an actuator by one or more of the following:

(A) by increasing an initial chill gas atmosphere pressure, $P_{0(1)}$ to a programmed or critical chill gas atmosphere pressure, $P_{0(crit)}$ wherein said valve is triggered to be openend by a sensor recording when said chill gas atmosphere developes said programmed or critical chill gas atmosphere pressure, $P_{0(crit)}$.

(B) by increasing an initial chill gas atmosphere pressure, $P_{0(1)}$ to a programmed or critical chill gas atmosphere pressure, $P_{0(cri)}$, wherein said valve is triggered to release a partial chill gas mass $\delta dm_0^V(P_{0(crit)})=\delta(-(m^V_{0(1)}-m^V_{0(crit)})$ when said chill gas atmosphere developes said programmed or critical chill gas atmosphere pressure, $P_{0(crit)}$, and by closing said valve when a reduced chill gas pressure $P_{0(4)}$ is reached, (C) by increasing an initial chill gas atmosphere pressure, $P_{0(1)}$ to a programmed or critical chill gas atmosphere pressure, $P_{0(crit)}$, wherein said valve is triggered to release a partial chill gas mass $\delta dm_0^V(P_{0(crit)})=\delta(-(m^V_{0(1)}-m^V_{0(crit)})$ adiabatically when said chill gas atmosphere developes said programmed or critical chill gas atmosphere pressure, $P_{0(crit)}$ and by closing said valve when an undercooled chill gas having pressure $P_{0(4)}$ is reached, (D) by increasing an initial chill gas atmosphere pressure, $P_{0(1)}$ to a programmed or critical chill gas atmosphere pressure, $P_{0(crit)}$, wherein said valve is triggered to release a partial chill gas mass $\delta dm_0^V(P_{0(crit)})=\delta(-(m^V_{0(1)}-m^V_{0(crit)})$ into at least one aeropneumatic accumulator storage atmosphere, wherein said valve releases a partial chill gas atmosphere mass $\delta dm_0^V(P_{0(crit)})=\delta(-(m^V_{0(1)}-m^V_{0(crit)})$ adiabatically, and by closing said valve.

12. The process according to claim 1, further comprising releasing said partial chill gas mass of said chill gas atmosphere into a storage atmosphere via said valve, wherein said valve is designed to be operated by an actuator by one or more of the following:

(A) by increasing an initial chill gas atmosphere temperature, $T_{0(1)}$ to a programmed or critical chill gas atmosphere temperature, $T_{0(crit)}$, wherein said valve is triggered to be openend by a sensor or a thermocouple recording when said chill gas atmosphere developes said programmed or critical chill gas atmosphere temperature, $T_{0(crit)}$.

(B) by increasing an initial chill gas atmosphere temperature, $T_{0(1)}$ to a programmed or critical chill gas atmosphere temperature, $T_{0(crit)}$, wherein said valve is triggered to release a partial chill gas mass $\delta dm_0^V(T_{0(crit)}) = \delta(-(m^V_{0(1)} - m^V_{0(crit)}))$ when said chill gas atmosphere developes said programmed or critical chill gas atmosphere temperature, $T_{0(crit)}$ and by closing said valve when a reduced chill gas temperature $T_{0(3)} < T_{0(crit)}$ is reached, (C) by increasing an initial chill gas atmosphere temperature, $T_{0(1)}$ to a programmed or critical chill gas atmosphere temperature, $T_{0(crit)}$, wherein said valve is triggered to release a partial chill gas mass $\delta dm_0^V(T_{0(crit)}) = \delta(-(m^V_{0(1)} - m^V_{0(crit)}))$ adiabatically when said chill gas atmosphere developes said programmed or critical chill gas atmosphere temperature, $T_{0(crit)}$, and by closing said valve when an undercooled chill gas having temperature $T_{0(4)} < T_{0(1)}$ is obtained, (D) by increasing an initial chill gas atmosphere temperature, $T_{0(1)}$ to a programmed or critical chill gas atmosphere temperature, $T_{0(crit)}$, wherein said valve is triggered to release a partial chill gas mass $\delta dm_0^V(T_{0(crit)}) = \delta(-(m^V_{0(1)} - m^V_{0(crit)}))$ into at least one aeropneumatic accumulator storage atmosphere when said chill gas atmosphere developes said programmed or critical chill gas atmosphere temperature, $T_{0(crit)}$, wherein said valve releases a partial chill gas atmosphere mass $\delta dm_0^V(T_{0(crit)}) = \delta(-(m^V_{0(1)} - m^V_{0(crit)}))$ adiabatically, and by closing said valve.

13. The process according to claim 1, further comprising releasing said partial chill gas mass of said chill gas atmosphere into a storage atmosphere via said valve, wherein said valve is designed to be operated by an actuator by one or more of the following:

(A) by increasing an initial chill gas atmosphere temperature, $T_{0(1)}$, to a programmed or critical chill gas atmosphere temperature, $T_{0(crit)}$, and subjecting said chill gas atmosphere to a heating rate, $(dT_0/dt)$, wherein said initial chill gas atmosphere temperature and said heating rate are recorded by a sensor or a thermocouple, wherein said valve is triggered to be openend when said chill gas atmosphere developes a programmed or critical chill gas atmosphere temperature, $T_{0(crit)}$, or sustains a programmed or critical heating rate, $(dT_0/dt)_{(crit)}$, (B) by increasing an initial chill gas atmosphere temperature, $T_{0(1)}$, a programmed or critical chill gas atmosphere temperature, and subjecting said chill gas atmosphere to a heating rate, $(dT_0/dt)$, wherein said valve is triggered to be openend by a sensor or a thermocouple recording when said chill gas atmosphere developes said programmed or critical chill gas atmosphere temperature, $T_{0//(crit)}$, or when said chill gas atmosphere sustains a programmed or critical heating rate, $(dT_0/dt)_{(crit)}$ wherein said valve releases a partial chill gas mass $\delta dm_0^V(T_{0(crit)}) = \delta(-(m^V_{0(1)} - m^V_{0(crit)}))$ or $\delta dm_0^V(dT_0/dt)_{crit}) = \delta(-(m^V_{0(1)} - m^V_{0(crit)}))$, and by closing said valve when a reduced chill gas temperature $T_{03} < T_{0(crit)}$ is reached, (C) by increasing an initial chill gas atmosphere temperature, $T_{0(1)}$, to a programmed or critical chill gas atmosphere temperature, $T_{01(crit)}$ and subjecting said chill gas atmosphere to a heating rate, $(dT_0/dt)$, wherein said valve is triggered to be openend by a sensor or a thermocouple recording when said chill gas atmosphere developes said programmed or critical chill gas atmosphere temperature, $T_{0(crit)}$, or when said chill gas atmosphere sustains a programmed or critical heating rate, $(dT_0/dt)_{crit}$, wherein said valve releases a partial chill gas mass $\delta dm_0^V(T_{0(crit)}) = \delta(-(m^V_{0(1)} - m^V_{0(crit)}))$ or $\delta dm_0^V(dT_0/dt)_{crit}) = \delta(-(m^V_{0(1)} - m^V_{0(crit)}))$ adiabatically, and by closing said valve when an undercooled chill gas having temperature $T_{0(4)} < T_{0(1)}$ is obtained, (D) by increasing an initial chill gas atmosphere temperature, $T_{0(1)}$ to a programmed or critical chill gas atmosphere temperature, $T_{0(1)crit}$ and subjecting said chill gas atmosphere to a heating rate, $(dT_0/dt)$, wherein said valve is triggered to release a partial chill gas mass $\delta dm_0^V(T_{0(crit)}) = \delta(-(m^V_{0(1)} - m^V_{0(crit)}))$ or $\delta dm_0^V(dT_0/dt)_{crit}) = \delta(-(m^V_{0(1)} - m^V_{0(crit)}))$ into at least one aeropneumatic accumulator storage atmosphere when said chill gas atmosphere developes said programmed or critical chill gas atmosphere temperature, $T_{0(crit)}$, or when said chill gas atmosphere sustains a programmed or critical heating rate, $(dT_0/dt)_{crit}$, wherein said valve releases a partial chill gas atmosphere mass $\delta dm_0^V(T_{0(crit)}) = \delta(-(m^V_{0(1)} - m^V_{0(crit)}))$ or $\delta dm_0^V(dT_0/dt)_{crit}) = \delta(-(m^V_{0(1)} - m^V_{0(crit)}))$ adiabatically, and by closing said valve.

14. The process according to claim 1, further comprising releasing a chill gas mass of said chill gas atmosphere, $\delta dm^V_0(P_{0(2)}) \delta(-(m^V_{0(1)} - m^V_{0(2)}))$, into said external atmosphere via storing in at least one aeropneumatic accumulator having a gas inlet valve for a gas inlet from the at least one closed vessel and a gas outlet valve for a gas outlet into said external atmosphere, wherein said gas outlet valve is designed to be operated by an actuator when said external atmosphere has an external gas pressure $P_3 < P_1$, wherein $P_1$ is a storage atmosphere pressure of a storage atmosphere in the at least one aeropneumatic accumulator and being recorded by a sensor, via one or more of the following:

(A) increasing said storage atmosphere pressure and triggering said gas inlet valve to close when said storage atmosphere developes a programmed or critical pressure $P_{1(crit)}$ and triggering said gas outlet valve to open, (B) increasing said storage atmosphere pressure and triggering said gas inlet valve to close when said storage atmosphere developes a programmed or critical pressure $P_{1(crit)}$ and triggering said gas outlet valve to open, wherein a partial storage atmosphere mass $\delta dm_1^V (P_{1crit}) = \delta(-(m^V_{1(1)} - m^V_{1crit}))$ is released into said external atmosphere, (C) increasing said storage atmosphere pressure and triggering said gas inlet valve to close when said storage atmosphere developes a programmed or critical pressure $P_{1crit}$ and triggering said gas outlet valve to open, wherein a partial storage atmosphere mass $\delta dm_1^V (P_{1crit}) = \delta(-(m^V_{1(1)} - m^V_{1crit}))$ is released adiabatically into said external atmosphere, (D) increasing said storage atmosphere pressure and triggering said gas inlet valve to close when said storage atmosphere developes a programmed or critical storage gas pressure differential $(dP_{1/3}/dx)_{crit}$ and triggering said gas outlet valve to open, wherein programmed or critical storage gas pressure differential comprises a pressure differential $dP_{13} = P_1 - P_3$, (E) increasing said storage atmosphere pressure and triggering said gas inlet valve to close when said storage atmosphere developes a programmed or critical storage gas pressure differential $(dP_{1/3}/dX)_{crit}$ and triggering said gas outlet valve to open, wherein a partial storage atmosphere mass $\delta dm_1^V(P_{1crit}) = \delta(-(m^V_{1(1)} - m^V_{1crit}))$ is released adiabatically into said external atmosphere.

15. The process according to claim 1, further comprising releasing an internal energy of said chill gas atmosphere via said mechanical work into at least one aeropneumatic accumulator by said valve prior to increasing an initial liquid chill agent temperature $T^L_{0(1)}$ of said liquid chill agent above a critical operating temperature $T_c^{P_0}$ of the at least one superconductor, wherein the at least one aeropneumatic accumulator is sealed off from said external atmosphere, and wherein said valve is a gas inlet valve of the at least one aeropneumatic accumulator to accommodate a partial chill gas mass of said chill gas atmosphere, $\delta dm^V_0(P_{0(2)})=\delta(-(m^V_{0(1)}-V_{0(2)}))$, and comprising accommodating a compression energy $dUcom$ by the at least one aeropneumatic accumulator, wherein the at least one aeropneumatic accumulator is designed to be operated via a sensor to monitor independently a pressure differential $dP/dx$ between a storage gas pressure of a storage atmosphere in the at least one aeropneumatic accumulator, $P_1$, and said chill gas pressure of said chill gas atmosphere in the at least one closed vessel, $P_0$, and by an actuator to open said valve for triggering one or more of the following:

(A) increasing an initial storage gas mass before a compression of said storage atmosphere, $m_{1(1)}$, to a compressed storage gas mass $m_{1(2)}$ after said compression of said storage atmosphere, (B) increasing an initial storage gas pressure before a compression of said storage atmosphere, $P_{1(1)}$, to a compressed storage gas pressure $P_{1(2)}$ after said compression of said storage atmosphere, (C) increasing an initial storage gas temperature before a compression of said storage atmosphere, $T_{1(1)}$, to a compressed storage gas temperature $T_{1(2)}$ after said compression of said storage atmosphere, (D) increasing adiabatically or nearly adiabatically an initial storage gas mass before a compression of said storage atmosphere, $m_{1(1)}$, to a compressed storage gas mass $m_{1(2)a}$ after said compression of said storage atmosphere, (E) increasing adiabatically or nearly adiabatically an initial storage gas pressure before a compression of said storage atmosphere, $P_{1(1)}$, to a compressed storage gas pressure $P_{1(2)a}$ after said compression of said storage atmosphere, (F) increasing adiabatically or nearly adiabatically an initial storage gas temperature before a compression of said storage atmosphere, $Ti(i)$, to a compressed storage gas temperature $TI(2)a$ alter said compression of said storage atmosphere.

16. The process according to claim 15, further comprising releasing at least a partial compression energy $\delta dU_{com}$ from the at least one aeropneumatic accumulator, wherein the at least one aeropneumatic accumulator is designed to be operated via a sensor to monitor a pressure differential $dP/dx$ between a storage gas pressure a of a storage atmosphere of at least one aeropneumatic accumulator, $P_{1(2)}$, and an external gas pressure of said external atmosphere, $P_3$, and by an actuator triggering a gas outlet valve to open by one or more of the following:

(A) decreasing a compressed storage gas mass after a compression of said storage atmosphere, $M_{1(2)}$ to a relaxed storage gas mass $M_{2(1)}$ alter releasing at least a part of said compressed storage gas mass, $dm_{1(2)}$, (B) decreasing a compressed storage gas pressure alter a compression of said storage atmosphere, $P_{1(2)}$, to a relaxed storage gas pressure $P_{2(1)}$ after reducing by at least a part $dP_{1(2)}$ said compressed storage gas pressure, (C) decreasing a compressed storage gas temperature after a compression of said storage atmosphere, $T_{1(2)}$, to a lower storage gas temperature $T_{2(1)}$ after decreasing by at least a part $dT_{1(2)}$ said compressed storage gas temperature, (D) decreasing adiabatically or nearly adiabatically a compressed storage gas mass after a compression of said storage atmosphere, $m_{1(2)}$, to a reduced storage gas mass $m_{2(1)a}$ after releasing at least a part of said compressed storage gas mass, $dm_{1(2)}$, (E) decreasing adiabatically or nearly adiabatically a compressed storage gas pressure after a compression of said storage atmosphere, $P_{1(2)}$, to a relaxed storage gas pressure $P_{2(1)a}$ alter reducing by at least a part $dP_{1(2)}$ said compressed storage gas pressure, (F) decreasing adiabatically or nearly adiabatically a compressed storage gas temperature after a compression of said storage atmosphere, $T_{1(2)}$, to a lower storage gas temperature $T_{2(1)a}$ alter decreasing by at least a part $dT_{1(2)}$ said compressed storage gas temperature.

17. The process according to claim 1, further comprising accommodating and releasing said energy by a plurality of the at least one closed vessel comprising said liquid chill agent and the at least one superconductor and said chill gas atmosphere, wherein the plurality is designed to be operated by one or more of the following:

(A) by essentially releasing said radiation energy and a partial chill gas mass, $\delta dm^V_0(P_{0(2)})=\delta(-(m^V_{0(1)}-m^V_{0(2)}))$, into two opposite directions and perpendicular to at least two adjacently arranged closed vessels, (B) by essentially releasing said radiation energy and a partial chill gas mass, $\delta dm^V_0(P_{0(2)})=\delta(-(m^V_{0(1)}-m^V_{0(2)}))$, into two opposite directions and perpendicular to at least two adjacently arranged closed vessels of the at least one closed vessel, wherein said partial chill gas atmosphere mass is released into at least one aeropneumatic accumulator, (C) by essentially releasing said radiation energy and a partial chill gas mass, $\delta dm^V_0(P_{0(2)})=\delta(-(m^V_{0(1)}-m^V_{0(2)}))$, into two opposite directions and perpendicular to at least two adjacently arranged closed vessels of the at least one closed vessel, wherein said partial chill gas atmosphere mass is released into two or more aeropneumatic accumulators arranged in parallel to each other and opposite to the main direction of a radiation emission, (D) by essentially releasing two or more partial chill gas masses, $\Sigma_i^{i=2\ to\ n}(\delta dM^V_0(P_{0(2)}))=\Sigma_i^{i=2\ to\ n}\delta(-(m^V_{0(1)}-m^V_{0(2)}))$, from at least two oppositely arranged closed vessels of the at least one closed vessel into at least one aeropneumatic accumulator, wherein the at least one aeropneumatic accumulator is arranged between the at least two oppositely arranged closed vessels, (E) by essentially releasing two or more partial chill gas masses, $\Sigma_i^{I=2\ to\ n}(\delta dM^V_0(P_{0(2)}))=\Sigma_i^{i=2\ to\ n}\delta(-(m^V_{0(1)}-m^V_{0(2)}))$, from at least two oppositely arranged closed vessels of the at least one closed vessel into at least one aeropneumatic accumulator, wherein the at least one aeropneumatic accumulator is arranged between the at least two oppositely arranged closed vessels, further essentially releasing said radiation energy into an opposite direction compared to the direction of said releasing said two or more partial chill gas atmosphere masses and perpendicular to the at least two oppositely arranged closed vessels, (F) by essentially releasing four or more partial chill gas masses, $\Sigma_i^{I=4\ to\ n}(\delta dM^V_0(P_{0(2)}))=\Sigma_i^{I=2\ to\ n}\delta(-(m^V_{0(1)}-$ $m^V_{0(2)}$)), from at least two oppositely arranged rows comprising at least two adjacently arranged closed vessels of the at least one closed vessel, further releasing said four or more partial chill gas atmosphere masses into at least one aeropneumatic accumulator arranged between the at least two oppositely arranged rows, (G) by essentially releasing four or more partial chill gas masses, $\Sigma_i^{i=4\ to\ n}(\delta dM^V_0(P_{0(2)}))=\Sigma_i^{i=4\ to\ n}\delta(-(m^V_{0(1)}-m^V_{0(2)}))$, from at least two oppositely arranged rows comprising at least two adjacently arranged closed vessels of the at least one closed vessel, further releasing said four or more partial chill gas atmosphere masses into at least one aeropneumatic accumulator arranged between the at least two oppositely arranged rows, wherein the at least two oppositely arranged rows essentially release said radiation energy into an opposite direction compared to the direction of said releasing said four or more partial chill gas atmosphere masses and perpendicular to the at least two oppositely arranged rows, (H) by essentially releasing four or more partial chill gas masses, $\Sigma_i^{i=4\ to\ n}(\delta dM^V_0(P_{0(2)}))=\Sigma_i^{i=4\ to\ n}\delta(-(m^V_{0(1)}-m^V_{0(2)}))$, from at least two oppositely arranged rows into a plurality of aeropneumatic accumulators arranged between the at least two oppositely arranged rows comprising at least two adjacently arranged closed vessels of the at least one closed vessel, wherein said plurality comprises at least four adjacently in parallel arranged aeropneumatic accumulators, further releasing said radiation energy into an opposite direction and perpendicular compared to the at least two oppositely arranged rows, wherein the at least two oppositely arranged rows comprise at least two adjacently arranged closed vessels of the at least one closed vessel releasing said four or more partial chill gas atmosphere masses into a zipper arranged spacial plurality of the at least four aeropneumatic accumulators.

18. The process according to claim 1, further comprising conducting laterally a partial conduction enthalpy $dH_{con}$ into at least one closed adjacent vessel comprising the liquid chill agent, the at least one superconductor and the chill gas atmosphere, wherein the at least one closed adjacent vessel is joined with the at least one closed vessel by a conducting material to form a plurality of the at least one closed vessel, wherein the at least one closed adjacent vessel is designed to be operated by providing a superior heat capacity relative to the at least one closed vessel via one or more of the following:

(A) by comprising a lower initial operating temperature than the at least one closed vessel, (B) by comprising a higher liquid chill agent mass than the at least one closed vessel, (C) by comprising a higher overall mass than the at least one closed vessel, wherein said overall mass comprises the at least one closed adjacent vessel, said liquid chill agent, the at least one superconductor and the chill agent atmosphere within the at least one closed adjacent vessel, (D) by comprising a higher specific heat capacity than the at least one closed vessel, (E) by comprising a higher overall heat capacity than the at least one closed vessel, wherein said overall heat capacity comprises a heat capacity of the at least one closed adjacent vessel, of said liquid chill agent, of the at least one superconductor and of the chill agent atmosphere within the at least one closed adjacent vessel, (F) by comprising a higher specific heat capacity of the liquid chill agent per unit of superconductor volume of the at least one superconductor, $(c_p/V_s)$ than the at least one closed vessel, (G) by comprising a higher specific heat capacity of the at least one superconductor than the at least one closed vessel.

(H) by comprising a higher gas storage capacity of the at least one aeropneumatic accumulator connected by at least one gas inlet valve than the at least one closed vessel, (I) a dewar accommodating one or more superconductors having the shape of a cylindrical disc or a cube of quadratic or rectangular or irregular dimensions, (J) by at least two closed vessels of the at least one closed vessel arranged adjacent to each other, wherein the at least two closed vessels comprise a common insulation against heat conduction from an environment into the at least two closed vessels, (K) by at least two closed vessels of the at least one closed vessel arranged adjacent to each other, wherein the at least one closed vessel accommodates a dewar for said liquid chill agent.

19. The process according to claim 1, wherein the at least one superconductor is a high critical temperature superconductor ((HT) superconductor or HTS) selected from the group consisting of Y—Ba—Cu—O, $YBa_2Cu_3O_7$, $YBa_2Cu_3O_{10}$, Bi—Sr—Ca—Cu—O, $Bi_2Sr_2CaCuO_6$, $Bi_2Sr_2CaCu_2O_8$, $Bi_2Sr_2Ca_2Cu_3O_{10}$, Tl—Ba—Ca—Cu—O, $Tl_2Ba_2Ca_2Cu_3O_x$, $(TlPb)(BaSr)_2Ca_2Cu_3O_x$, Hg—Ba—Ca—Cu—O, La—Ba—Cu—O and La—Sr—Cu—O.

20. The process according to claim 1, wherein the at least one superconductor is a high critical temperature superconductor ((HT) superconductor or HTS) consisting of a single crystal or bicrystal, wherein said single crystal or bicrystal is in an as-cast or an anisotropic or a textured or a machined or an as-cast and anisotropic or an as-cast and textured and anisotropic and machined condition having a shape selected from the group consisting of a disc, a ring or a cube shape selected from the group consisting of a regular form, an irregular form, a rectangular form, a quadratic form and a triangle form.

21. The process according to claim 1, further comprising exploring the diamagnetic behaviour of the at least one superconductor by applying the magnetic field of at least one permanent magnet to the at least one superconductor, wherein said process further comprises generating a levitating state of the at least one closed vessel and insulating said closed vessel from heat conduction from an environment during the at least one time interval of said process cycle, dt, wherein the at least one superconductor is at least partially immersed in said liquid chill agent, said process further comprising levitating and carrying a load along a translation on a track comprising the at least one permanent magnet by using a superconducting magnetic levitation apparatus having one or more of the following:

(A) the at least one closed vessel, and (B) at least one aeropneumatic accumulator, wherein said partial chill gas mass is from time to time released from the at least one vessel into the at least one aeropneumatic accumulator.

22. The process according to claim 1, further comprising levitating and carrying a load on a track comprising two separate permanent magnets arranged in parallel by using a superconducting magnetic levitation apparatus having at least one aeropneumatic accumulator arranged between at least two oppositely arranged closed vessels each having at least one valve, wherein the at least two oppositely arranged closed vessels are designed to isolate a liquid chill agent of the at least one superconductor and a chill gas atmosphere coexisting with said liquid chill agent from said external atmosphere during said application.

23. The process according to claim 1, further comprising moving a superconducting magnetic levitation apparatus into at least one direction by using at least one propulsion coil for a linear propulsion and at least one permanent magnet, wherein said linear propulsion comprises one or more of the following:

(A) cooling said propulsion coil independently at a coil temperature designated as $T_4$, (B) insulating and/or cooling the at least one permanent magnet independently at a temperature designated as $T_5$, (C) cooling the at least one propulsion coil independently at a coil temperature designated as $T_4$, wherein the at least one propulsion coil is separated from the at least one permanent magnet, (D) cooling the at least one propulsion coil independently at a coil temperature designated as $T_4$, wherein said linear propulsion heats an electrically conducting part for operation of the superconducting magnetic levitation apparatus in a moving magnetic field of said propulsion coil, further transferring said convection enthalpy from said electrically conducting part to the at least one propulsion coil.

24. The process according to claim 1, further comprising emitting said radiation energy or said convection enthalpy into an external gas pressure $P_3$ of said external atmosphere, wherein the external gas pressure comprises one or more of the following:

(A) an overpressure>1 atm accommodated by a closed chamber, (B) a vacuum pressure or underpressure<1 atm accommodated by a vacuum chamber, (C) an atmosphere of controlled composition accommodated by a closed chamber, (D) a vacuum pressure or underpressure<1 atm accommodated by a vacuum chamber, wherein said vaccum chamber is continuously being evacuated by an evacuating pump station having a pumping speed ranging from 10 to 40000 1/sec, (E) a vacuum pressure or underpressure<1 atm comprising a partial storage atmosphere mass $\delta dm_1^V(P_{1(crit)}) = \delta(-m^V_{1(1)-m}{}^V_{1(crit)})$ accommodated in a vacuum chamber or in a closed chamber, wherein said partial storage atmosphere mass is released from an aeropneumatic accumulator from time to time and being removed from said vacuum chamber or from said closed chamber by an evacuating pump station, (F) a vacuum pressure or underpressure<1 atm accommodated by a vacuum chamber, wherein said vacuum chamber comprises at least one wall or at least one device comprising a mean height of a surface unevenness or surface asperity ranging from 0.1 to 4 micron, (G) a vacuum pressure or underpressure<1 atm accommodated by a vacuum chamber, wherein said vacuum chamber comprises at least one wall or at least one device comprising a mean height of a surface unevenness or surface asperity ranging from 1 to 10 micron, (H) a temperature $T_3$ above a critical temperature Tc of a high $T_c$ superconductor and above a temperature, $T_L$, of said chill agent, (I) a mass flow imparted by suction flow of an external pump system, wherein said mass flow suppresses electromagnetic radiation and/or heat convection, (J) a mass flow imparted by suction flow of an external pump system inside an insulating layer, wherein said mass flow suppresses electromagnetic radiation and/or heat convection.

25. The process according to claim 24, further comprising emitting a radiation energy from an emission surface of at least one independent wall toward the at least one closed vessel, wherein said emission surface is selected from the group consisting of a polished surface, a white surface, a metallic surface and a brilliant surface, further emitting said radiation energy over one or more of the following emission distances $X_1$ comprising said external gas pressure $P_3$:

(A) $X_1$ between said emission surface of a chamber wall of a chamber accommodating the at least one closed vessel and a vessel surface of the at least one closed vessel, (B) $X_1$ between said emission surface of a support wall of a load support for carrying a load, wherein said load comprises a load temperature $T_6$, and a vessel surface of the at least one closed vessel, further keeping apart said emission surface from said vessel surface by an insulating material, (C) $X_1$ between said emission surface of a propulsion coil for a linear propulsion of a superconducting magnetic levitation apparatus and a vessel surface of the at least one closed vessel, (D) $X_1$ between said emission surface of a non-magnetic electrically conducting part of a superconducting magnetic levitation apparatus and a vessel surface of the at least one closed vessel, further keeping apart said emission surface from said vessel surface by an insulating material, (E) $X_1$ between said emission surface of a chamber wall of an external dewar surrounding the at least one closed vessel and a vessel surface of the at least one closed vessel, further keeping apart said emission surface from said vessel surface by an insulating material, (F) $X_1$ between said emission surface of at least one permanent magnet to the at least one closed vessel and a vessel surface of the at least one closed vessel.

26. The process according to claim 24, further comprising convecting a convection heat from a relatively warm surface of at least one independent wall toward the at least one closed vessel, wherein said warm surface comprises an insulating coating selected from the group consisting of a dewar, a polystrene coating, a polyurethane coating, a polyethylene coating and a rubber material, further convecting said convection heat over one or more of the following convection distances $X_2$ comprising said external gas pressure $P_3$:

(A) $X_2$ between said relatively warm surface of a chamber wall of a chamber accommodating the at least one closed vessel and a vessel surface of the at least one closed vessel, (B) $X_2$ between said relatively warm surface of a load conveyed by a superconducting magnetic levitation apparatus, wherein said load comprises a load temperature $T_6$, and a vessel surface of the at least one closed vessel, further keeping apart said relatively warm surface from said vessel surface by an insulating material.

(C) $X_2$ between said relatively warm surface of a support wall of a load support for carrying a load, wherein said load comprises a load temperature $T_6$, and a vessel surface of the at least one closed vessel, further keeping apart said relatively warm surface from said vessel surface by an insulating material.

(D) $X_2$ between said relatively warm surface of a propulsion coil for a linear propulsion of a superconducting magnetic levitation apparatus and a vessel surface of the at least one closed vessel.

(E) $X_2$ between said relatively warm surface of a non-magnetic electrically conducting part of a superconducting magnetic levitation apparatus and a vessel surface of the at least one closed vessel, further keeping apart said relatively warm surface from said vessel surface by an insulating material.

(F) $X_2$ between said relatively warm surface of a chamber wall of an external dewar surrounding the at least one closed vessel and a vessel surface of the at least one closed vessel, further keeping apart said relatively warm surface from said vessel surface by an insulating material.

(G) $X_2$ between said relatively warm surface of at least one permanent magnet to the at least one closed vessel and a vessel surface of the at least one closed vessel.

27. The process according to claim 24, further comprising convecting a convection heat or emitting a radiation energy from a non-magnetic electrically conducting part of a superconducting magnetic levitation apparatus to a cooled propulsion coil for linear propulsion, wherein an emitting surface or a relatively warm surface face of said non-magnetic electrically conducting part is selected from the group consisting of a black surface, a mat surface and a highly thermally conducting surface.

28. The process according to claim 1, further comprising carrying a load by employing a stationary temperature relationship $T_6 >_{T3} > T^L_0$, of the liquid agent, wherein T6 is an independent load temperature of a load carried by a superconducting magnetic levitation apparatus, $T_3$ is an external gas temperature of said external atmosphere and $T^L_0$ is a liquid chill agent temperature of said liquid chill agent.

29. The process according to claim 1, further comprising carrying a load by employing a stationary temperature relationship $T_3 > T_6 > T^L_0$, of the liquid agent, wherein $T_6$ is an independent load temperature of said load carried by a superconducting magnetic levitation apparatus, $T_3$ is an external gas temperature of said external atmosphere and $T^L_0$ is a liquid chill agent temperature of said liquid chill agent.

30. The process according to claim 28, further comprising carrying a load by employing one or more of the following stationary temperature relationships:

(A) $T_6 > T_4 > T_3 > T^L$
(B) $T_6 > T_3 > T_4 > T^L_0{}^o$ and wherein $T_4$ is a coil temperature of a propulsion coil for linear propulsion of said superconducting magnetic levitation apparatus.

31. The process according to claim 30, further comprising carrying a load by employing one or more of the following stationary temperature relationships:

(A) $T_3 > T_6 > T_4 > T^L$
(B) $T_4 > T_6 > T_3 > T^{Lo}$ and wherein $T_4$ is a coil temperature of a propulsion coil for linear propulsion of said superconducting magnetic levitation apparatus.

32. The process according to claim 1, further comprising carrying a conveyance load having a load weight $\Omega$ accommodated on a support, wherein said load weight $\Omega$ and a weight of the at least one closed vessel and the at least one aeropneumatic accumulator and the liquid chill agent and the chill gas atmosphere and said support and at least one storage gas atmosphere and at least one insulation and a non-magnetic electrically conducting part develope a gravitational force ranging from 0.1 N up to 40000 N per resulting superconducting magnetic levitation apparatus, further comprising carrying said load over at a carrying time ranging from 0.5 hours to 20 hours.

33. The process according to claim 1, further comprising carrying a conveyance load having a load weight $\Omega$ accommodated on a support, wherein said load weight $\Omega$ and a weight of the at least one closed vessel and the at least one aeropneumatic accumulator and the liquid chill agent and the chill gas atmosphere and said support and at least one storage gas atmosphere and at least one insulation a non-magnetic electrically conducting part develope a gravitational force ranging from 0.1 N up to 20000 N per resulting superconducting magnetic levitation apparatus, further comprising carrying said load over at a carrying time ranging from 1.0 hours to 4.0 hours.

34. The process according to claim 1, further comprising cooling the at least one superconductor by a liquid cooling agent selected from the group of liquid nitrogen, liquid argon, liquid oxygen, liquid hydrogen, liquid helium and liquid matter having a temperature below a critical temperature of a superconductor.

35. The process according to claim 34, further comprising a liquid cooling agent heat capacity per volume of the at least one superconductor and per the at least one closed vessel, $c_p/V_s$, wherein said liquid cooling agent comprises a heat capacity range in one or more of the following:

(A) $0.1$ $JK^{-1}cm^{-3}$ smaller or equal to $(c_p/V_s)$ smaller or equal to $k_1*(c_p/V_s)_{crit}$, wherein $(c_p/V_s)_{crit}$ exceeds a critical weight $W_{crit}$ of a superconducting magnetic levitation apparatus above which said superconducting magnetic levitation apparatus stops to levitate or overcoming heat conduction from an external object, wherein $k_1$ is a superconducting magnetic levitation apparatus constant depending on a superconducting magnetic levitation apparatus design, (B) $0.1$ $JK^{-1}cm^{-3}$ smaller or equal to $(c_p/V_s)$ smaller or equal to $k_2{}^*C_p/V_s)_{crit}$, wherein $(c_p/V_s)_{crit}$ exceeds a critical weight $W_{crit}$ of a superconducting magnetic levitation apparatus above which said superconducting magnetic levitation apparatus stops to levitate or overcoming heat conduction from an external object, wherein $k_2$ is a superconducting magnetic levitation apparatus constant depending on a superconducting magnetic levitation apparatus size of a given design, (C) $0.1$ $JK^{-1}cm^{-3}$ smaller or equal to $(c_p/V_s)$ smaller or equal to $100$ $JK^{-1}cm^{-3}$, (D) $0.1$ $JK^{-1}cm^{-3}$ smaller or equal to $(c_p/V_s)$ smaller or equal to $1000$ $JK^{-1}cm^{-3}$, (E) $10$ $JK^{-1}cm^{-3}$ smaller or equal to $(c_p/V_s)$ smaller or equal to $10000$ $100$ $J$ $K^{-1}cm^{-3}$, 36. The process according to claim 34, wherein the at least one superconductor is a high critical temperature superconductor ((HT) superconductor or HTS) comprising a levitation force $F_N$ in one or more of the following ranges:

(A) $0.3$ N/g smaller or equal to $F_N$ smaller or equal to $0.8$ N/g (B) $0.4$ N/g smaller or equal to $F_N$ smaller or equal to $1.1$ N/g.

37. The process according to claim 34, wherein the at least one superconductor is a high critical temperature superconductor ((HT) superconductor or HTS) comprise a specific density p in one or more of the following ranges:

(A) 4.5 g/cm³ smaller or equal to ρ smaller or equal to 5.4 g/cm³

(B) 5.05 g/cm³ smaller or equal to ρ smaller or equal to 5.8 g/cm³

(C) 5.4 g/cm³ smaller or equal to ρ smaller or equal to 6.1 g/cm³

(D) 5.5 g/cm³ smaller or equal to ρ smaller or equal to 6.3 g/cm³

38. An apparatus for carrying out the process according to claim 1, wherein said apparatus comprises at least one closed vessel having at least one valve and at least one thermocouple and at least one dilatation and/or shrinking recording strip, wherein the at least one closed vessel is designed to accommodate a mass of one or more of the following constituents:

(A) said chill gas atmosphere comprising increasing pressure, (B) said liquid chill agent used to chill at least one superconductor, and (C) the at least one superconductor, wherein the at least one superconductor comprises at least one superconductive material, wherein said apparatus further comprises at least one load support and at least one permanent magnet, wherein the at least one superconductor and the at least one permanent magnet are designed to levitate said apparatus and an additional load and wherein the at least one valve and the at least one dilatation recording strip and the at least one thermocouple are designed to be operated by telecommunication for release of a partial chill gas mass, $\delta dm_0^V$, during an operating time interval, $\delta t$, from said chill gas atmosphere through the at least one valve to an external atmosphere.

39. The apparatus according to claim 38, further comprising at least one aeropneumatic accumulator connected with the at least one closed vessel via the at least one valve to store a partial chill gas mass from the at least one closed vessel, $\delta dm_0^V$, and having a gas outlet valve for release of a storage gas atmosphere into an external atmosphere.

40. The apparatus according to claim 39, wherein the at least one closed vessel or the at least one aeropneumatic accumulator is fabricated from a metal selected from the group consisting of a pure copper, a pure aluminium, a pure titanium, a pure tantalum, a pure silver, a brass, a forged vessel metal and a welded vessel metal.

41. The apparatus according to claim 39, wherein the at least one closed vessel or the at least one aeropneumatic accumulator is fabricated from an alloy selected from the group consisting of a stainless steel, a copper based alloy, an aluminium based alloy, a titanium based alloy, a silver based alloy, a fully rigid material, a forged vessel alloy and a welded vessel alloy.

42. The apparatus according to claim 39, wherein the at least one closed vessel or the at least one aeropneumatic accumulator is fabricated from an inflatable material selected from the group consisting of a polystrene, a polyurethane, a polyethylene, a rubber material and a pure metal.

43. The apparatus according to claim 38, further comprising at least one dewar accommodated by the at least on closed vessel or accommodating the at least one vessel.

44. The apparatus according to claim 38, wherein the at least one closed vessel is insulated by an insulating material selected from the group consisting of a polystrene coating, a polyurethane coating, a polyethylene coating, a nitrile, a butyl, a neopren, a natural rubber, an ethylene-propylene, a wool, a foam and a ceramic.

45. The apparatus according to claim 39, wherein the at least one closed vessel or the at least one aeropneumatic accumulator is fabricated by forging.

46. The apparatus according to claim 39, further comprising a welded structure, wherein structure is welded under a vacuum.

47. The apparatus according to claim 39, wherein the at least one closed vessel or the at least one aeropneumatic accumulator comprises a smooth external surface selected from the group consisting of a polished surface, a white surface, a metallic surface and a brilliant surface.

48. The apparatus according to claim 39, further comprising at least one propulsion coil for a linear propulsion of said apparatus, wherein the at least one vessel apparatus comprises one or more of the following:

(A) a load support for a conveyance load separated from the at least one closed vessel by an unconventional insulation against heat conduction, wherein said unconventional insulation comprises at least one distance accommodating an insulating rigid material for keeping apart said load support from the at least one closed vessel and an empty space comprising an external atmosphere mean free path, (B) an unconventional insulation against heat conduction between the at least one closed vessel and the at least one aeropneumatic accumulator, (C) an unconventional insulation against heat conduction between the at least one closed vessel and a non-magnetic electrically conducting part for operation in a moving magnetic field of the at least one propulsion coil, (D) an unconventional insulation against heat conduction between the at least one closed vessel and the at least one permanent magnet for levitation of said apparatus.

49. The apparatus according to claim 48, further comprising an independent cooling system of both the at least one permanent magnet and the at least one propulsion coil.

50. The apparatus according to claim 48, further comprising at least one rotatable closed vessel mounted on a bearing which is fixed to a rotatable rod, wherein the rotatable rod serves as a pivot to rotate the at least one closed vessel in an inhomogeneous magnetic field to reduce flux creep in the at least one superconductor compared to a rigid closed vessel under identical conditions, wherein the rotable rod comprises at least one insulation against heat conduction and is accommodated by said load support.

51. The apparatus according to claim 48, further comprising a plurality of the at least one closed vessel, wherein said plurality comprises a thermally conducting joint between at least two laterally connected closed vessels of the at least one closed vessel.

52. The apparatus according to claim 48, further comprising a plurality of the at least one aeropneumatic accumulator laterally arranged in parallel, wherein said plurality is mounted between at least two oppositely arranged closed vessels of the at least one closed vessel.

53. The apparatus according to claim 52, wherein said plurality is arranged between at least two oppositely arranged rows comprising at least two adjacently arranged closed vessels of the at least one closed vessel, wherein said plurality comprises at least four adjacently in parallel arranged aeropneumatic accumulators.

* * * * *